(12) United States Patent
Bosley

(10) Patent No.: US 9,709,069 B2
(45) Date of Patent: Jul. 18, 2017

(54) HYBRID DRIVE ENGINE

(71) Applicant: David C. Bosley, Columbus, IN (US)

(72) Inventor: David C. Bosley, Columbus, IN (US)

(73) Assignee: DAYSPRING CHURCH OF GOD APOSTOLIC, Columbus, IN (US)

( * ) Notice: Subject to any disclaimer, the term of this patent is extended or adjusted under 35 U.S.C. 154(b) by 815 days.

(21) Appl. No.: 14/059,765

(22) Filed: Oct. 22, 2013

(65) Prior Publication Data

US 2015/0110614 A1 Apr. 23, 2015

(51) Int. Cl.
| | |
|---|---|
| *F01D 1/36* | (2006.01) |
| *F04D 29/28* | (2006.01) |
| *F04D 17/16* | (2006.01) |
| *F04D 29/08* | (2006.01) |

(52) U.S. Cl.
CPC ............ *F04D 29/288* (2013.01); *F01D 1/36* (2013.01); *F04D 17/161* (2013.01); *F04D 29/083* (2013.01); *Y02T 50/671* (2013.01)

(58) Field of Classification Search
CPC . F01D 1/34; F01D 1/36; F04D 29/288; F04D 29/083; F04D 17/161; Y02T 50/671
USPC ......................................................... 415/90
See application file for complete search history.

(56) References Cited

U.S. PATENT DOCUMENTS

| | | | |
|---|---|---|---|
| 1,061,142 A | 5/1913 | Tesla | |
| 1,061,206 A | 5/1913 | Tesla | |
| 2,087,834 A | 7/1937 | Brown et al. | |
| 3,715,887 A | 2/1973 | Weatherly et al. | |
| 3,747,334 A | 7/1973 | Bruder et al. | |
| 3,941,104 A | 3/1976 | Egli | |
| 4,186,554 A | 2/1980 | Possell | |
| 4,252,498 A | 2/1981 | Radcliffe et al. | |
| 4,402,647 A * | 9/1983 | Effenberger | F01D 1/36 415/90 |
| 4,403,911 A | 9/1983 | Possell | |
| 4,414,805 A | 11/1983 | Walker | |
| 4,456,265 A | 6/1984 | Adler | |
| 4,467,600 A | 8/1984 | Peikert | |

(Continued)

FOREIGN PATENT DOCUMENTS

| | | |
|---|---|---|
| CN | 201002715 Y | 1/2008 |
| DE | 2025399 A1 | 12/1971 |

(Continued)

OTHER PUBLICATIONS

Aerobie Pro Ring Website Information datedOct. 18, 2012.
International Search Report and Written Opinion for PCT/US14/61478 dated Feb. 5, 2015; 11 pages.

*Primary Examiner* — Richard Edgar
(74) *Attorney, Agent, or Firm* — Overhauser Law Offices LLC

(57) ABSTRACT

A hybrid drive engine uses air foil shaped disks of a first configuration for a compressor portion thereof and air foil shaped disks of a second configuration for a turbine portion thereof, whereby the disks exhibit aerodynamic effects of lift. Particularly, the compressor disks are configured to cause aerodynamic lift off of a periphery of the disks, while the turbine disks are configured to cause aerodynamic lift off of an inner hole of the disks. The aerodynamic nature of the disks cause each disk thereof to form two opposing airfoil shapes either head to head or trailing edge to trailing edge across the through hole.

31 Claims, 20 Drawing Sheets

(56) References Cited

U.S. PATENT DOCUMENTS

| | | | |
|---|---|---|---|
| 4,825,643 | A | 5/1989 | Hennecke |
| 5,297,926 | A * | 3/1994 | Negishi .................. F04D 5/001 415/198.1 |
| 5,472,313 | A | 12/1995 | Quinones et al. |
| 5,680,764 | A | 10/1997 | Viteri |
| 6,079,197 | A | 6/2000 | Attia |
| 6,224,325 | B1 * | 5/2001 | Conrad .................... F01D 1/36 415/90 |
| 6,227,795 | B1 | 5/2001 | Schmoll, III |
| 6,503,067 | B2 | 1/2003 | Palumbo |
| 7,165,540 | B2 | 1/2007 | Brookshire et al. |
| 7,314,035 | B2 | 1/2008 | Akmandor et al. |
| 7,328,570 | B2 | 2/2008 | Venkataramani et al. |
| 7,341,424 | B2 * | 3/2008 | Dial .......................... F01D 1/36 415/90 |
| 7,536,864 | B2 | 5/2009 | Wolfe et al. |
| 7,543,440 | B2 | 6/2009 | Callas et al. |
| 7,784,261 | B2 | 8/2010 | Little |
| 7,793,493 | B1 | 9/2010 | McIlroy |
| 8,066,479 | B2 | 11/2011 | El-Aini et al. |
| 8,087,885 | B2 | 1/2012 | Suciu |
| 8,104,257 | B2 | 1/2012 | Norris et al. |
| 8,192,141 | B1 | 6/2012 | Dale |
| 8,205,456 | B1 | 6/2012 | Brostmeyer |
| 8,206,115 | B2 | 6/2012 | Gupta et al. |
| 8,235,150 | B2 | 8/2012 | Mustafa |
| 2002/0182054 | A1 | 12/2002 | Entrican, Jr. |
| 2008/0304974 | A1 | 12/2008 | Marshall et al. |
| 2013/0039742 | A1 * | 2/2013 | Wilson .................... F01D 1/36 415/68 |
| 2013/0039744 | A1 | 2/2013 | Woody |
| 2013/0046228 | A1 | 2/2013 | Bourne |

FOREIGN PATENT DOCUMENTS

| | | |
|---|---|---|
| EP | 0388613 A1 | 2/1990 |
| WO | 8500199 A1 | 1/1985 |
| WO | 2004044412 A1 | 5/2004 |
| WO | 2009154796 A1 | 12/2009 |
| WO | 2012076726 A1 | 6/2012 |
| WO | 2012110987 A1 | 8/2012 |

* cited by examiner

HYBRID DRIVE ENGINE

FIELD OF THE INVENTION

The present disclosure relates to devices for increasing the pressure of fluids such as air, or changing a fluid's thermodynamic energy into mechanical energy for propulsion and, more particularly, to a propulsion system that utilizes aerodynamically configured spinning disks to yield a dynamic response from the resulting slipstream.

BACKGROUND

Propulsion systems that utilize compressors and turbines are well known. Previously, compressors or fluid compression systems more or less impart sudden changes, vibrations and shocks to redirect and or compress the fluid. One object of the present invention is to move and provide a motive force to a fluid without imparting cavitation similar shocks. While turbines or turbine systems have been designed to take advantage of the flow characteristics of hot fluids by utilizing a series of aerodynamic vanes that extend radially outward from and are evenly spaced on a rotatable axis such as a shaft. Hot fluid flow in the turbine exchanges its thermodynamic energy by impinging upon the vanes so as to rotate the shaft. However, because of excessive heat of the fluid, some turbine versions suffer problems such as stretching, melting and otherwise stressing of the vanes. These can be especially dangerous circumstances that not only could damage the turbine, but could cause components to break or free themselves from the turbine, especially when loaded with centrifugal energy.

Further, the methodology to attach the aerodynamic vanes to the shaft is very time consuming, complex, cumbersome and thus expensive. Even so, compressors and turbines with aerodynamic vanes are routinely used and are designed in an attempt to overcome their centripetal or thermal deficiencies and avoid the aforementioned complications. As such, some compressors employ pistons, paddles, vanes or blades to impart energy to the fluid flow. Additionally, turbine vanes are designed with holes, bores, and/or other configurations that allow cooling air or other fluid(s) to flow through them to help maintain their resistance to metal fatigue. This however, adds to the cost of production, maintenance, and complicates the arrangement and layout of the compressor/turbine system.

Vane-less or variant compressor/turbine systems have been developed that do not suffer from the complications of compressor/turbine systems with vanes. One such vane-less design utilizes Prandtl Layer compressor/turbine systems of smooth disks to utilize adhesion and viscosity of fluids to exchange the fluid movement, to increase the pressure of the final outlet fluid or in the turbine utilize thermodynamic energy from smooth disks into rotation of a central shaft. This arrangement, however, fails to afford a high efficiency method of energy exchange.

Another vane-less arrangement by Nikola Tesla employs a plurality of substantially planar parallel disks between which fluid is directed. However, this arrangement fails to efficiently contend with turbulent losses that exist at both the input and output of the compressor/turbine systems due to the use of input nozzles and spider-mounted shaft disks. This arrangement also suffers losses resulting from "scrubbing" of the peripheral turbine casing. These, along with end-wall flow coupling illustrate just a few of the known problems of such compressor/turbine systems.

Overall, these various arrangements and the prior art as a whole, fail to implement aerodynamically efficient compressor/turbine systems designs. At best, it can be said that some compressor/turbine systems provide at least neutral aerodynamic features. Consequently, these designs suffer in overall efficiency from this shortcoming alone. Often to successfully overcome these shortcomings requires technological mechanism(s) that significantly over complicate compressor/turbine systems arrangement, layout, and capital outlay required for implementation.

In view of the above, it can be appreciated that a mechanism which imparts simplicity of design and implementation along with a methodology to significantly increase the efficiency of the compressor/turbine system is highly desirable as well as attractive financially. Moreover, a mechanism that increases the mass of air or other fluid within a compression system within a given volume or as well in converting heat energy to mechanical energy while eliminating the typical turbine system is also highly desirable as well as attractive financially.

It would therefore be desirable to have a vane-less compressor/turbine system that overcomes the above cited deficiencies.

It would therefore also be desirable to have a vane-less compressor/turbine system that provides a more aerodynamic energy conversion mechanism.

The present invention sufficiently accomplishes these means.

SUMMARY OF THE INVENTION

A hybrid drive engine is provided having a compressor section, a turbine section and a central shaft that mechanically links both the compressor and turbine sections, the compressor and turbine sections each having a plurality of symmetrical annular disks (disk stack) that are each aerosculpted (i.e. aerodynamically configured) for aerodynamic effects of lift. The compressor disks of the disk stack are each configured to cause aerodynamic lift off of a periphery of the disks/disk stack, while the turbine disks of the disk stack are configured to cause aerodynamic lift off of an inner (through) hole of the disks/disk stack. The aerodynamic nature of the disks/disk stack cause each disk thereof to form two opposing airfoil shapes either head to head or trailing edge to trailing edge across the through hole. The present hybrid drive engine increases efficiency and advantage of the shear disk design that capitalizes on boundary layer air flow and adhesion with the Bernoulli advantage of lift without over complicating the design of the disks/disk stack.

In one form, the compressor section has first and second compressor portions each having a compressor disk stack of a plurality of aerosculpted compressor disks, while the turbine section has first and second turbine portions each having a turbine disk stack of a plurality of aerosculpted turbine disks.

In a particular form, an aerosculpted disk has an annular body defining an inner perimeter, an outer perimeter, and an airfoil having a cross-section comprising a line defining a lower surface, a convex line defining an upper surface and reaching a zenith that is the highest point on the airfoil section of the aerosculpted disk, and a separator lip on the upper surface and located on or proximate the outer perimeter, the separator lip extending to a narrow peak that is higher than an immediately adjacent portion of the upper surface. The separator lip may be lower than the zenith of the convex surface.

In a particular form, an aerosculpted disk has an annular airfoil defined by an upper surface and a lower surface, an axis of revolution, a projected reference plane that is normal to the axis of revolution, and an inner perimeter and outer perimeter, the annular airfoil configured such that at least a portion of the annular airfoil has a negative airfoil angle relative to the projected reference plane such that at, least in the portion, the outer perimeter is lower than the inner perimeter when the projected reference plane is horizontal and the disk is oriented with the upper surface uppermost, thereby compensating for air downwash and balancing the lift fore and aft in the disk.

The present hybrid drive engine operates in the following manner. Air (fluid) enters an inlet pulled by a fan. This air is then drawn in by the compressor disks which compress the air. The compressed air is then ported through a one way flow diffuser before being channeled into combustors and then being ported into tangential inlets to the turbine section. Upstream of the tangential inlets to the turbine are inlet ports for a combustor, igniter, and flame. The net result of the combustor flame, the high density compressor air and the adhesion-viscosity is that the now expanding tangential exhaust fluid onto the turbine stack turns the shaft. The shaft is physically linked to the compressor and fan. When the shaft turns it provides power to sustain operation of the hybrid drive engine.

BRIEF DESCRIPTION OF THE DRAWINGS

The above mentioned and other features of this invention, and the manner of attaining them, will become apparent and the invention itself will be better understood by reference to the following description of embodiments of the invention taken in conjunction with the accompanying drawings, wherein.

Although the drawings represent embodiments of various features and components according to the present invention, the drawings are not necessarily to scale and certain features may be enhanced in order to better illustrate and explain the present invention. The exemplifications set out herein thus illustrate embodiments of the invention, and such exemplifications are not to be construed as limiting the scope of the invention in any manner.

DETAILED DESCRIPTION

Those of skill in the art will understand that various details of the invention may be changed without departing from the spirit and scope of the invention. Furthermore, the foregoing description is for illustration only, and not for the purpose of limitation, the invention being defined by the claims.

Figure 1:
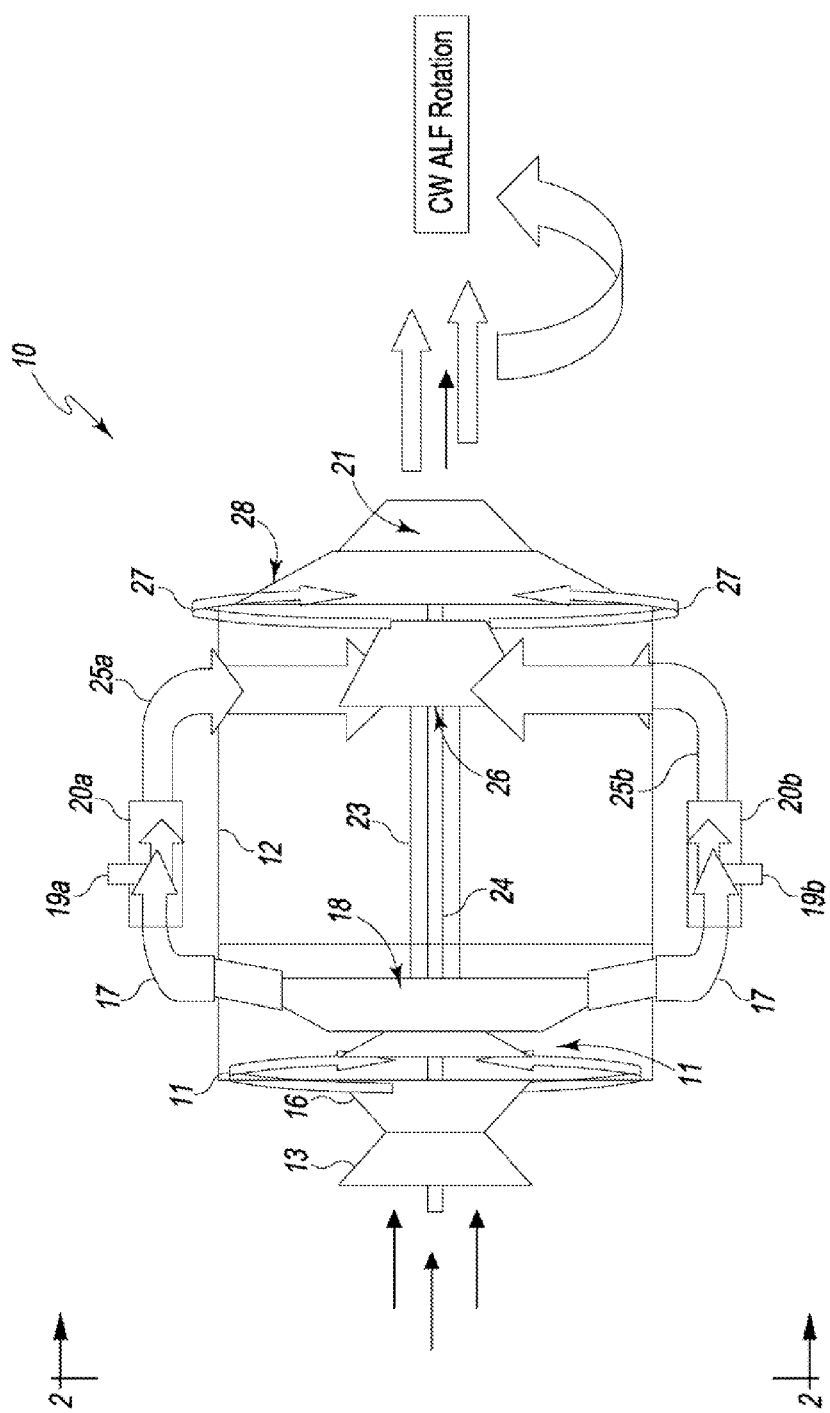
FIG. 1 is a side plan view of a hybrid drive engine fashioned in accordance with the principles of the present invention.
Figure 2:
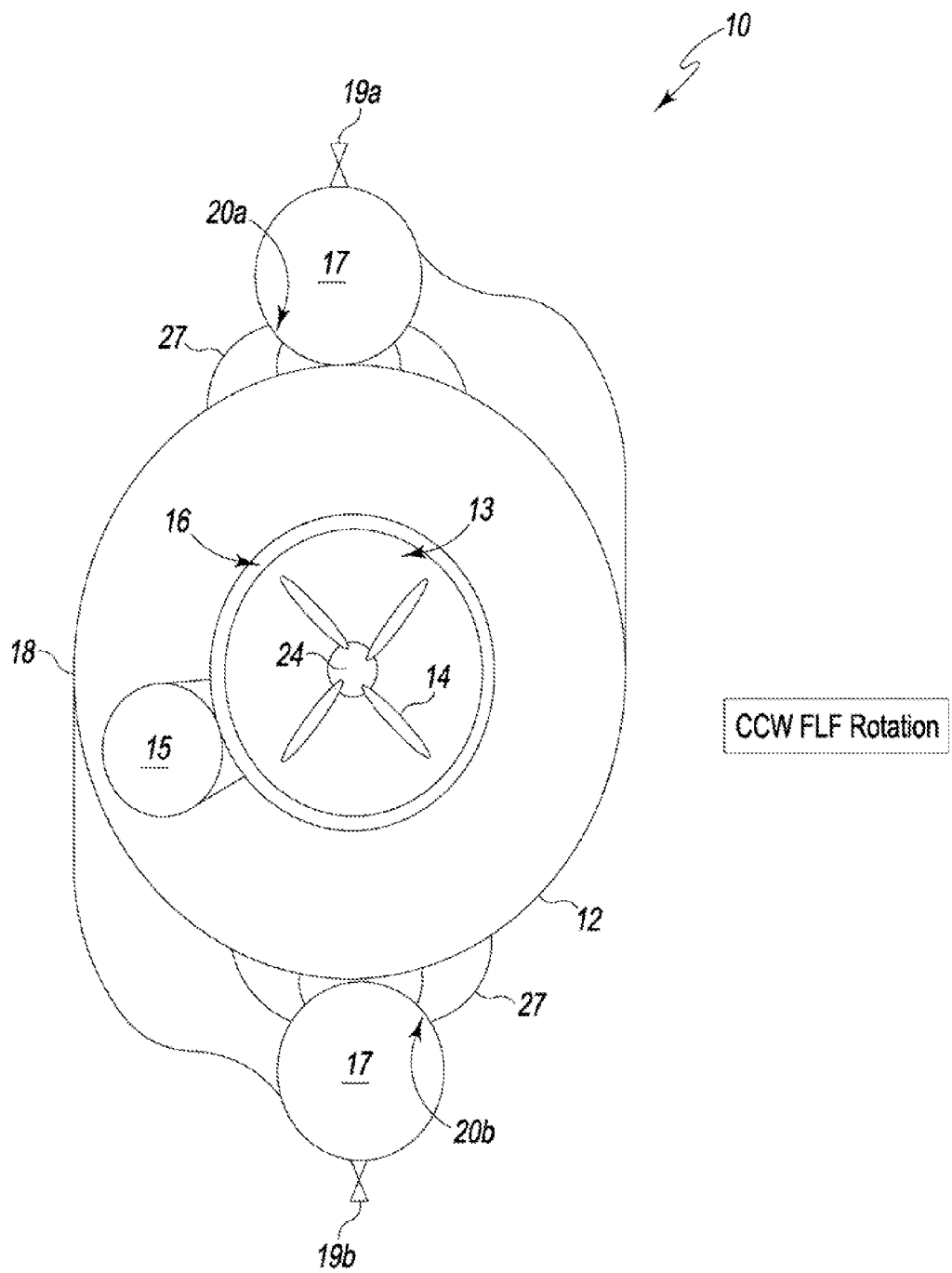
FIG. 2 is a front plan view of the hybrid drive engine of FIG. 1 taken along line 2-2 thereof.

FIGS. 1 and 2 depict two views of an exemplary configuration or embodiment of a hybrid drive ("hydrive") engine generally designated 10, fashioned in accordance with the present principles. The hybrid drive engine 10 is a "bladeless" or "vane-less" propulsion unit that utilizes aerodynamically configured ("aerosculpted"), annular spinning disks to yield a dynamic response from the resulting slipstream as described herein.

The hybrid drive engine 10 includes a housing 12 fashioned from a suitable material that can withstand the various pressures and other parameters of an engine. Without being exhaustive, suitable materials include aluminum, plastic, steel, titanium, other metal, metal alloy, or ceramic. Other non-listed materials may be used and are contemplated. The hybrid drive engine 10 includes an air inlet or fan intake 13 that is shaped to receive and funnel air into a fan 14 that directs the incoming air into a first stage compressor 16. The first stage compressor 16 compresses air via a first compressor disk stack 29 of aerodynamically configured ("aerosculpted") disks 30 (see e.g. FIG. 3). The first compressor disk stack 29 receives an airflow normal to the plane of the disk stack 29 and provides a tangential flow of compressed air. As shown in FIG. 2, the hybrid drive engine 10 includes a starter motor 15 that is coupled to a central core shaft 24 on which the fan 14 is situated for initially rotating the core shaft 24 and the fan 14 to provide initial air flow into the core. The starter motor 15 is preferably, but not necessarily, an electric motor that is connected to a battery or other electricity source (not shown). It should be appreciated that the fan starter can be gear driven, belt driven, link driven, a combination thereof or driven by other means. The fan 14 could be sized small for low airflow into the core, sized medium for intermediate airflow into the core, or sized large for high airflow into the core and bypass air. Alternatively, the present hybrid drive engine 10 may be designed without a fan for self-entrained airflow into the core.

The hybrid drive engine 10 further includes a second stage compressor 18 that receives air compressed by and from the first stage compressor 16 via a duct 11. The duct 11 is situated to receive the tangential flow of fluid (e.g. airflow) from the first stage compressor 16 and provide that airflow normal to the second stage compressor 18. The second stage compressor 18 compresses the air previously compressed by the first stage compressor via a second compressor disk stack 38 of the aerodynamically configured ("aerosculpted") compressor disks 30 (again, see e.g. FIG. 3). The second stage compressor 18 is in communication with a scroll duct 17 that receives two tangential flows of further compressed air from the second stage compressor 18.

The scroll duct 17 directs a first further compressed fluid (e.g. airflow) from the second stage compressor 18 to a first combustor or torrid section 20a, while as second further compressed fluid (e.g. airflow) from the second stage compressor 18 to a second combustor or torrid section 20b. The first combustor 20a includes a first valve 19a that valves fuel from a fuel source (not shown) into the combustor 20a in order to affect combustion therein and heat the portion of fluid tangentially flowing from the second compressor 18 into the first combustor 20a. The second combustor 20b includes a second valve 19b that valves fuel from a fuel source (not shown) into the combustor 20b in order to affect combustion therein and heat the fluid tangentially flowing from the second compressor 18 into the second combustor 20b.

Figure 14:
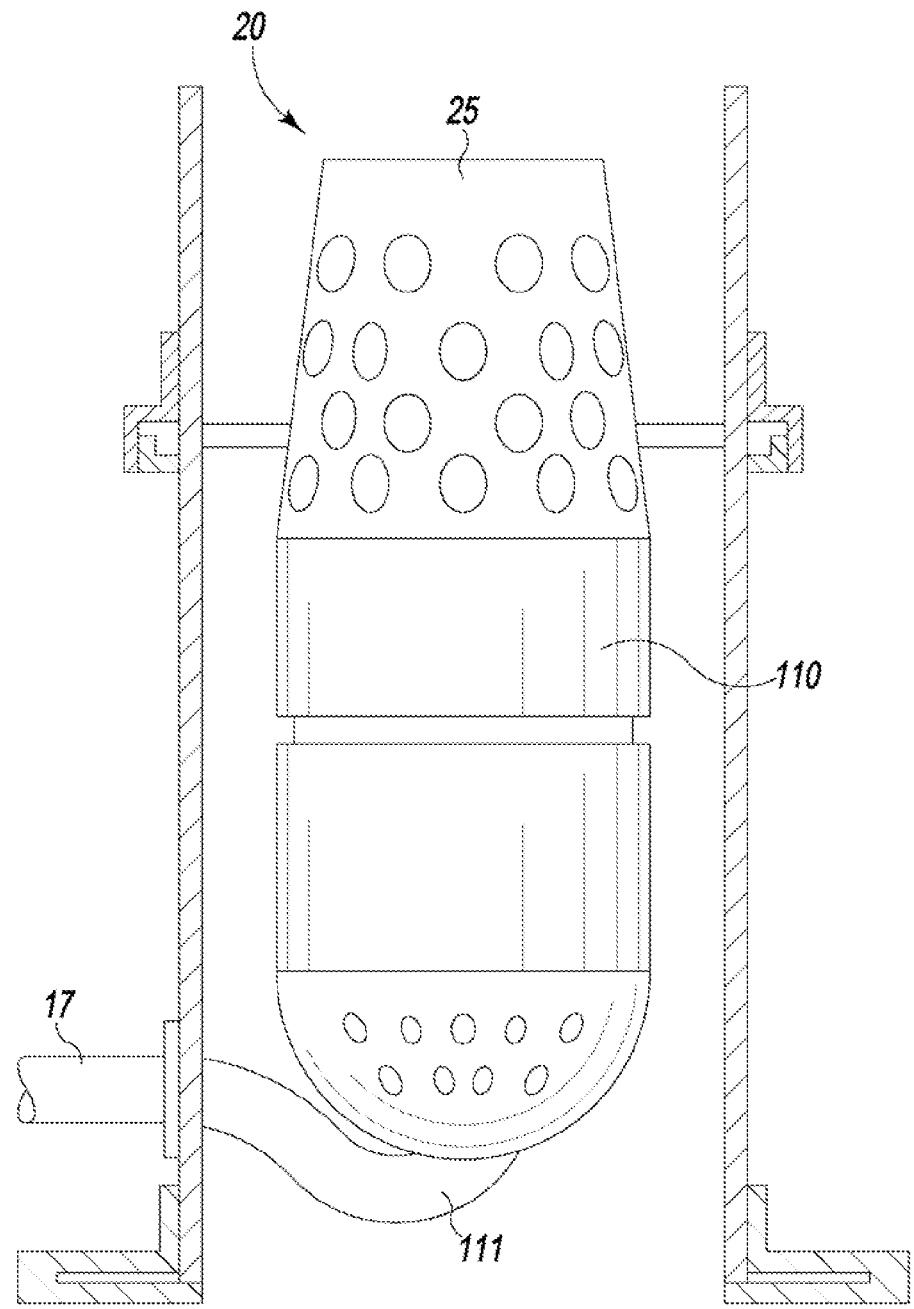
FIG. 14 is an exemplary embodiment of a torrid section or combustor for the present hybrid drive engine.

An exemplary combustor or igniter generally designated 20 representing first and second combustors/igniters 20a, 20b is shown in FIG. 14, the combustor/igniter 20 provides or is a part of a high energy ignition system to ignite the mixed air/fuel mixture. The combustor 20 has a body 110 that is mounted to a frame that preferably may, but may not, be connected to the housing or casing 12 of the hybrid drive engine 10. Both fuel and air enter through duct 17 and enter the igniter at 111. Inside the body 110 the air is entrained and mixed with the fuel. The heated airflow (hot air/gas) exits via the outlet duct 25 and is further mixed with the air. The heater airflow is then directed into the ducting leading into the first or primary turbine section 44. It should be appreciated that the combustor 20 may take different forms and configurations depending on the type of fuel used for combustion (i.e. heating the airflow).

Referring back to FIGS. 1 and 2, the first combustor 20a is in communication with a first outlet duct 25a which is in communication with a first stage turbine 26, while the second combustor 20b is in communication with a second outlet duct 25b which is likewise in communication with the first stage turbine 26. The first stage turbine 26 expands air via a first turbine disk stack 40 of aerodynamically configured ("aerosculpted") turbine disks 41 (see FIG. 3). The heated and further compressed air from the first combustor 20a is provided tangentially to the first stage turbine 26, while the heated and further compressed air from the second combustor 20b is provided tangentially to the first stage turbine 26 preferably, but not necessarily, opposite to the tangential airflow from the first outlet duct 25a. Air ducting 27, in communication with the first stage turbine 26, receives two tangential flows of expanded air from the first stage turbine 26 and provides that airflow tangentially to a second stage turbine 28. The second stage turbine 28 further expands the an via a second turbine disk stack 44 of aerodynamically configured ("aerosculpted") turbine disks 41 (again, see e.g. FIG. 3). The air ducting 27 provides the two flows of expanded air from the first stage turbine 26 tangentially into the second stage turbine 28. Output from the second stage turbine 28 is provided normal to the second turbine disk stack 44 via outlet 21.

Figure 3:
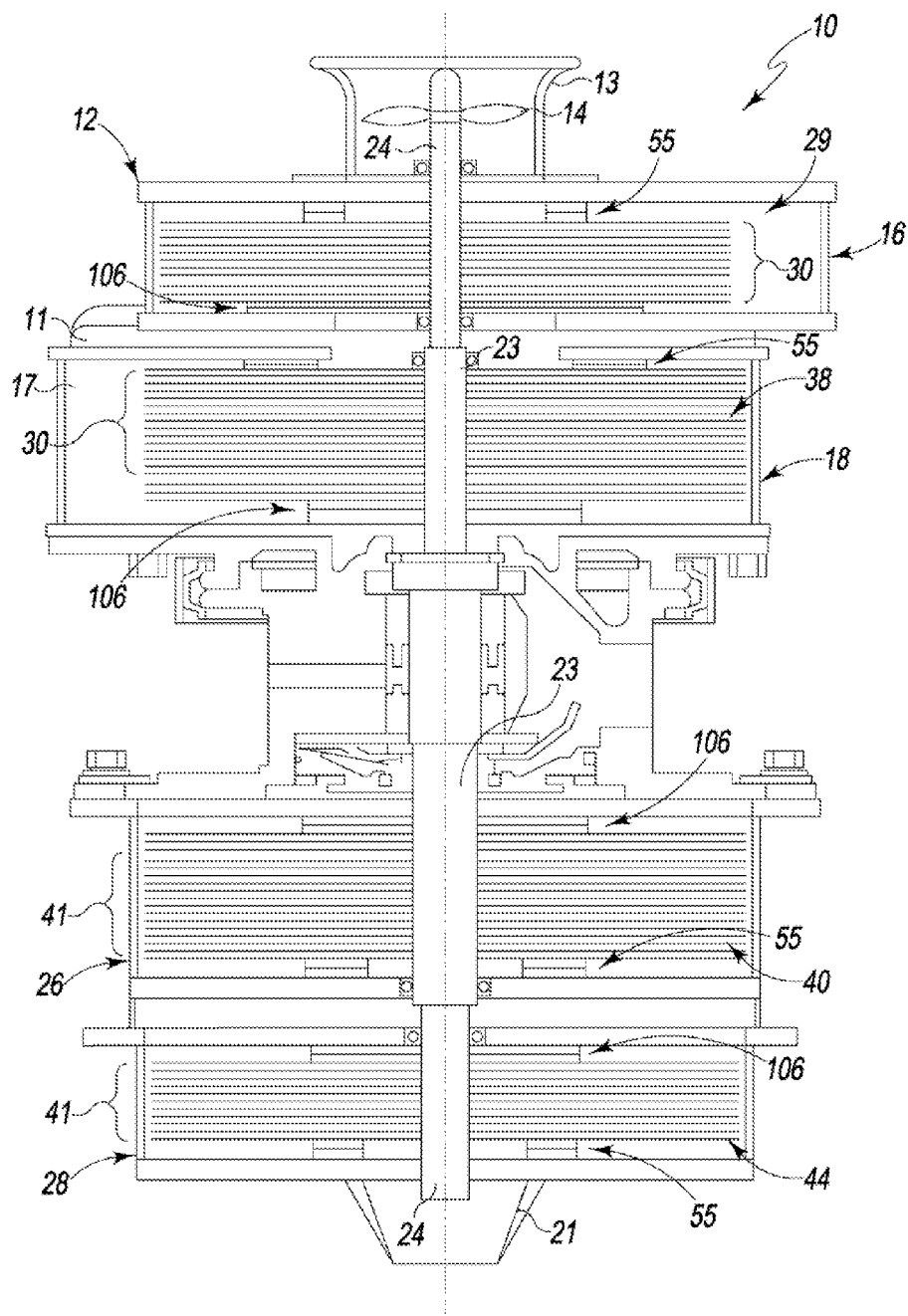
FIG. 3 is an enlarged sectional view of the hybrid drive engine of FIG. 1.

A sectional view of the present hybrid drive engine 10 without the combustors and associated ducting or the starter motor is depicted in FIG. 3. As seen, a central or core shaft 24 extends the length of the housing 12 from the fan 14 through the second stage turbine 28, while an outer shaft 23 is provided between the compressor section 18 and the turbine section 28. Without being exhaustive, the core shaft 24 and/or shaft 23 may be made from aluminum, steel, titanium, other metal, and/or metal alloy. Other non-listed materials may be used and are contemplated.

As indicated above, the present hybrid drive engine 10 has a first or primary compressor section 16, a second or secondary compressor section 18, a first or primary turbine section 26, and a second or secondary turbine section 28 each of which defines a respective internal chamber that holds a compressor disk stack or a turbine disk stack. It is important for the chambers of each section to be sealed with respect to each other and to the ambient. In furtherance of this, each chamber includes a chamber seal structure 55 and a shaft seal structure 106 each of which has labyrinth structures. These seal structures prevent the air or hot gases from exiting the casing/housing 12 in an improper manner (e.g. following the paths of least resistance to escape the casing of the respective section).

With additional reference to FIGS. 13, 18A-C, and 19A-B, the seal structure 55 and its associated components are shown. The seal structure 55 includes a wall plate 102 that is formed, made or provided in the chamber casing (wall) and an end disk 100 that is a first disk of the first and second compressor disk stacks 29, 38 and of the first and second turbine disk stacks 40, 44. Labyrinth features of the seal structure 55 (i.e. the end disk 100 and the wall plate 102)

helps to prevent build-up of air frictional forces that reduce the efficiency of the hybrid drive engine 10.

Figure 19A:
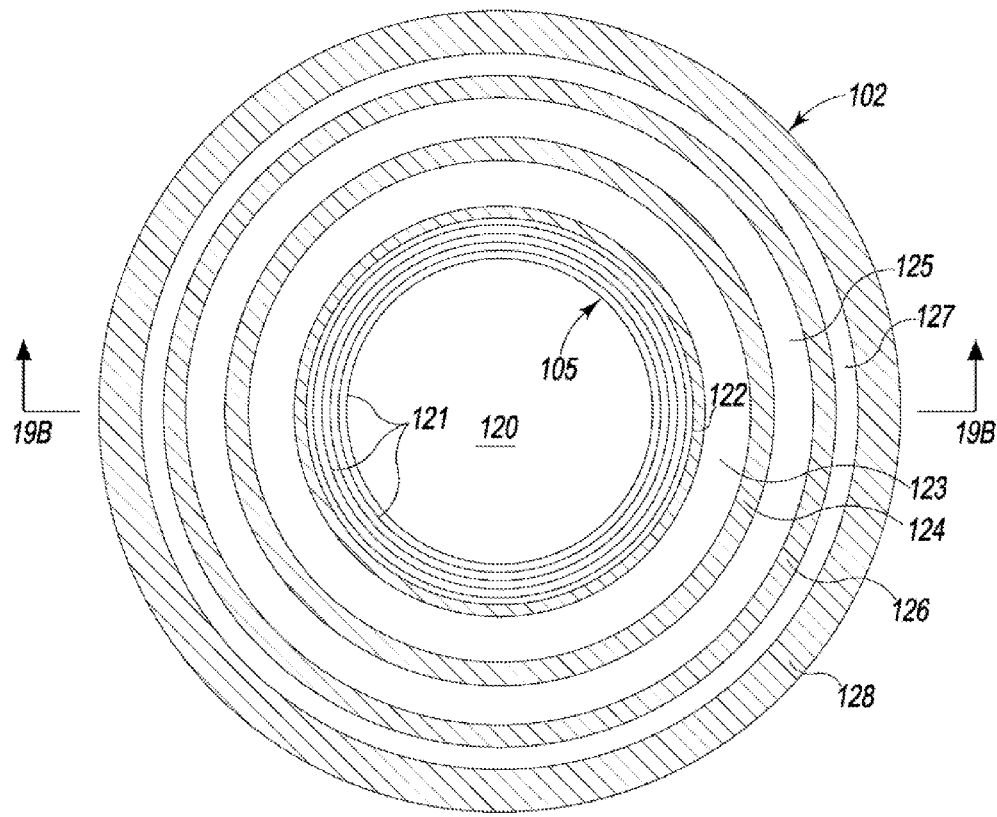
FIG. 19A is a top plan view of a labyrinth wall plate in accordance with the present principles.
Figure 19B:
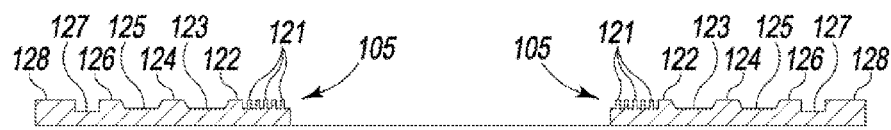
FIG. 19B is a sectional view of the labyrinth wall plate of FIG. 19A taken along line 19B-19B thereof.

As particularly seen in FIGS. 19A and 19B, the wall plate 102 includes a central opening 120 for allowing the central shaft 24 to pass through the wall plate 102. A sealing structure 105 comprising a plurality of perpendicular fingers 121 extend radially outwardly from and annularly about the opening 120. A first annular projection 122 is radially outwardly adjacent the fingers 121 with a first annular trough 123 radially outwardly adjacent the first annular projection. A second annular projection 124 is radially outwardly adjacent the first annular trough 123, while a second annular trough 125 is radially outwardly adjacent the second annular projection 124. A third annular projection 126 is radially outwardly adjacent the second annular trough 125, while a third annular trough 127 is radially outwardly adjacent the third annular projection 126. Lastly, a fourth annular projection 128 is radially outwardly adjacent the third annular trough 127. The fourth annular projection 128 provides a peripheral rim to the wall plate 102.

Figure 18A:
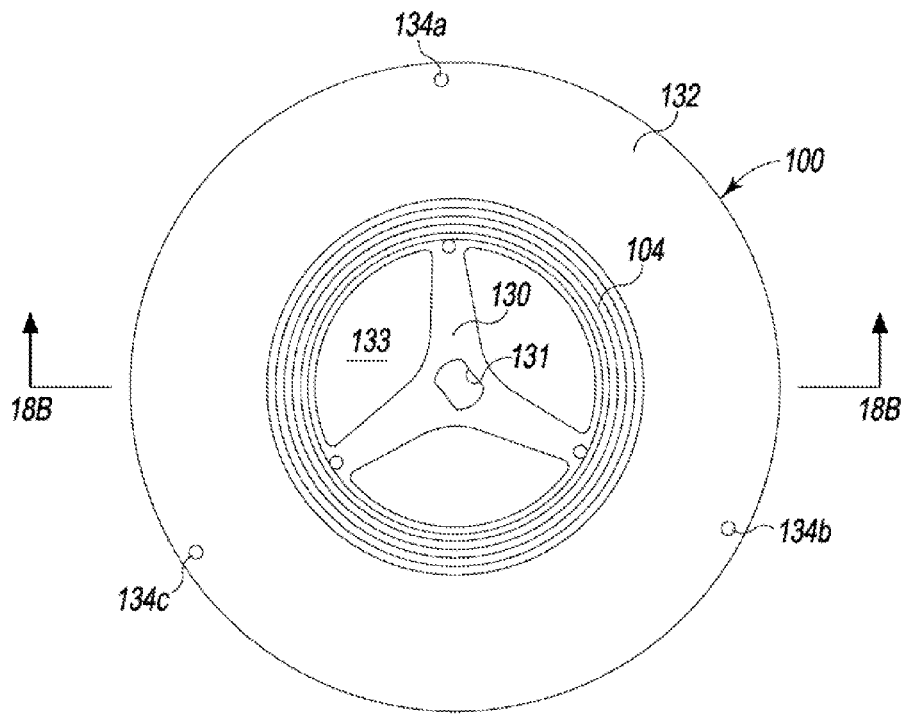
FIG. 18A is a plan view of a labyrinth end disk in accordance with the present principles.
Figure 18B:
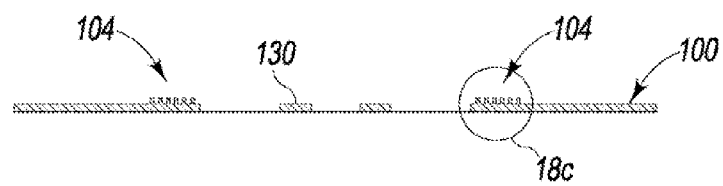
FIG. 18B is a sectional view of the labyrinth end disk of FIG. 18A taken along line 18B-18B thereof.
Figure 18C:
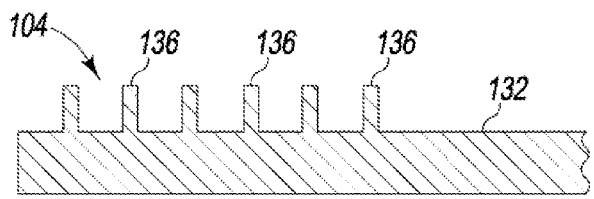
FIG. 18C is an enlarged view of a portion of the sectional view of the labyrinth end disk of FIG. 18B taken around circle 18C-18C thereof.

As particularly seen in FIGS. 18A, 18B and 18C, the end disk 100 of the seal structure 55 has a generally annular shape having a central opening 133 with a spoke structure 130 extending from the sides of the opening 133 into the center. A configured bore 131 is provided in the center or the spoke structure 130 for receiving the central shaft 24. The end disk 100 also has labyrinth features that cooperate with the labyrinth features of the wall plate 102 or shaft seal 106 as appropriate. Adjacent the opening 120 is a sealing structure 104 consisting of a plurality of annual fingers 136 that project normal to the plane of the disk 100. While six (6) fingers 136 are shown, there may be more or less fingers as desired and/or necessary to provide sealing. The fingers 136 and the fingers 121 of the wall plate 102 are spaced to mesh with one another (see FIG. 13). The end disk 100 further has a planar portion 132 radial to the sealing structure 104. The planar portion 132 extends from the radially outmost finger 136 to the outer periphery of the end disk 100.

Figure 13:
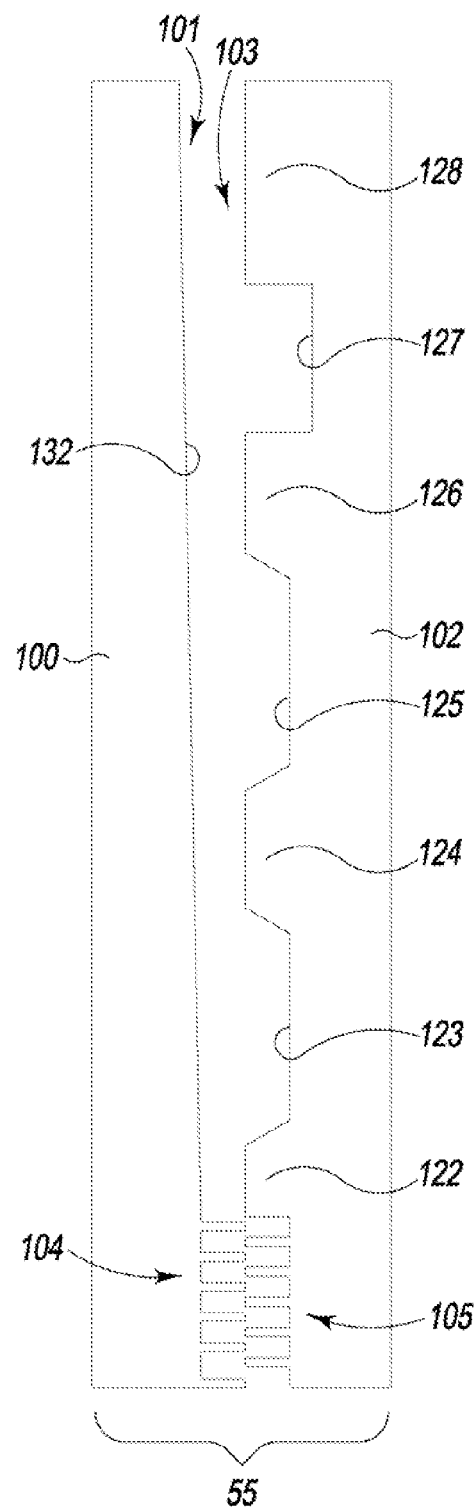
FIG. 13 is an enlarged side view of labyrinth seal disks of the present invention that prevent compressed air or exhaust gas from escaping the present hybrid drive engine.

In FIG. 13, an enlarged portion of the wall plate 102 and the end plate 100 of the sealing structure 55 is shown. This enlargement shows how the fingers of the two sealing structures 104, 105 mesh as well as the interaction of the planar portion 132 of the end disk 100 and the configured troughs and projections of the wall plate. Without being exhaustive, the two sealing structures themselves can be made of metal or ceramic or some such abraidable material, or other metal, or metal alloy. Other non-listed materials may be used and are contemplated. The arrows 101 and 103 indicate entrained air that is prevented from escaping the engine section due to the labyrinth seals/plates 100, 102.

Figure 20A:
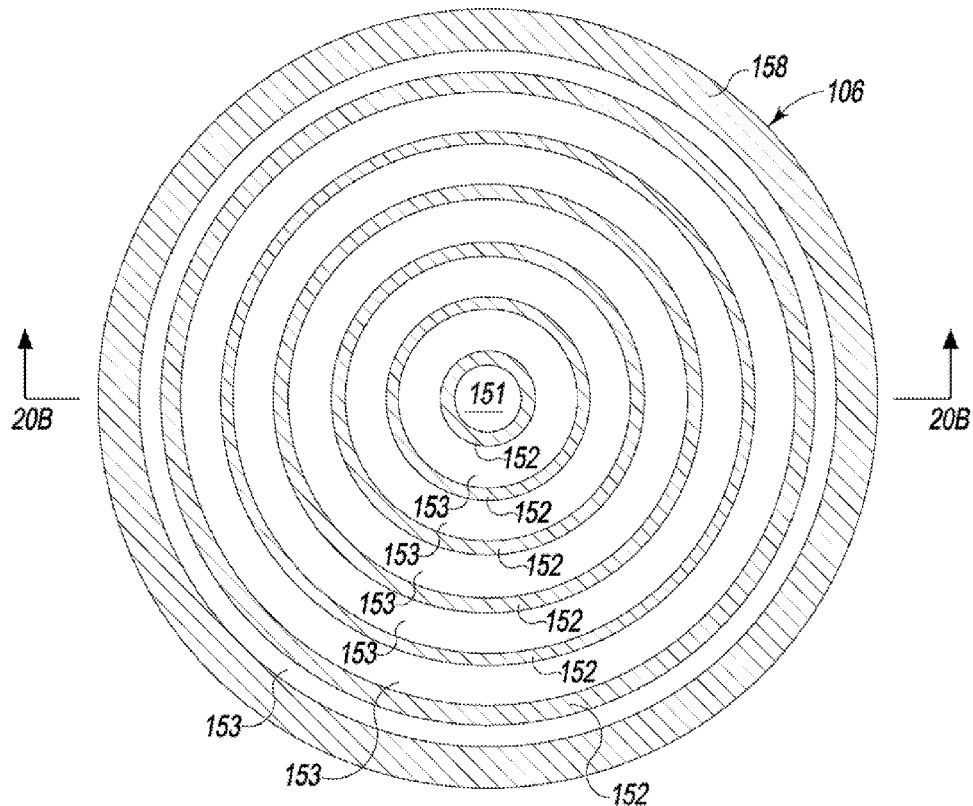
FIG. 20A is a top plan view of a shaft wall plate/seal in accordance with the present principles.
Figure 20B:
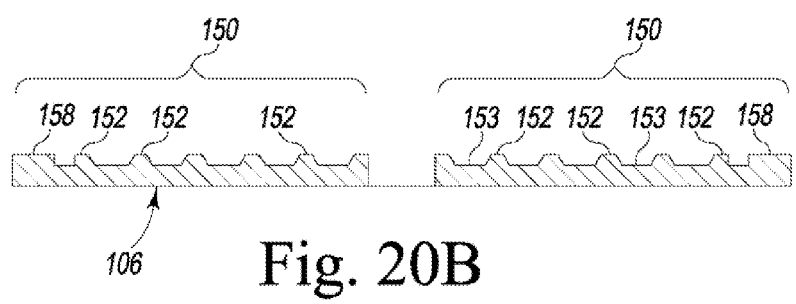
FIG. 20B is a sectional view of the shaft wall plate/seal of FIG. 20A taken along line 20A-20A thereof.

The shaft seal or disk 106 is particularly shown in FIGS. 20A and 20B. The disk 106 has a central bore 151 through which the shaft 24 extends. The disk 106 has a series 150 of annular projections 152 and annular notches 153 that extend radially outwardly from the central bore 151. An outermost annular projection 158 is provided at the periphery of the disk 106. The projection 158 is larger in width than the other projections 152.

The top casing for the compressor sections and the end casing for the turbine sections have the matching labyrinth seals to prevent the compressed air or hot gasses from exiting the casing. Each labyrinth end disk 104 is thicker than the rest of the disks. The exhaust nozzle 21 section has a sealing structure 55 as seen in FIG. 3. However, the top or start of the turbine disk stack which is forward most on the stack, has only a thick wall shaft plate 106 made into the casing and a regular end disk without labyrinth features.

Figure 4:
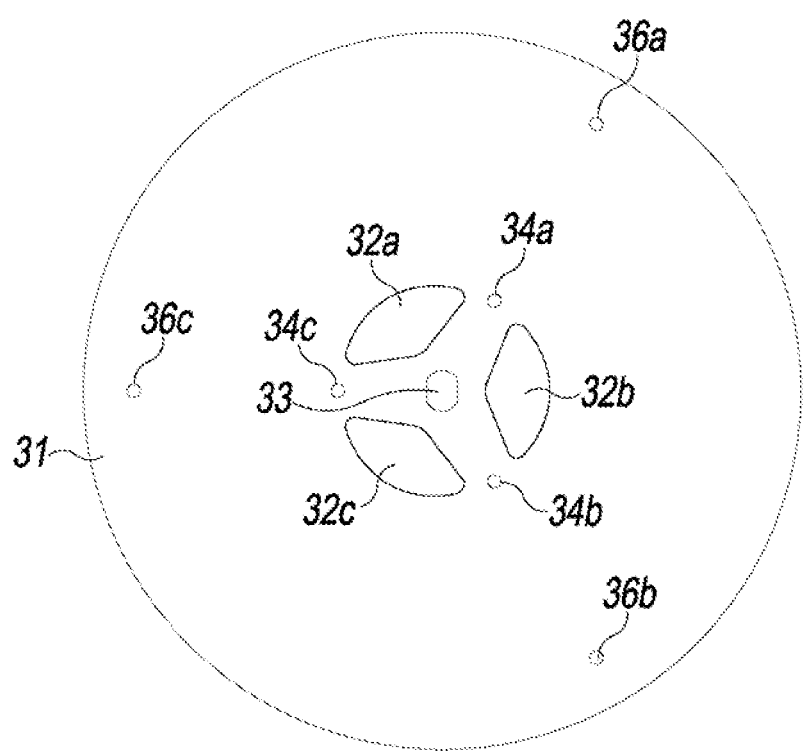
FIG. 4 is a top plan view of an end disk for a compressor disk stack of the present invention.

Referring now to FIG. 4, there is depicted an end disk for the compressor disk stacks 29, 38, generally designated 31. The end disk 31 is defined by a generally planar disc of a particular thickness having a central opening 33 for the central shaft 24 and three (3) configured openings 32a, 32b, 32c that are radially outwardly positioned relative to and from the central opening 33. The openings 32a, 32b, 32c allow incoming air to flow through the disc. If desired, the openings 32a-c may be shaped differently if desired and/or there may be more or less openings. Additionally, the end disk 31 has three (3) radially inward threaded bores 34a, 34b, 34c and three (3) radially outward threaded bores 36a, 36b, 36c that are all configured to receive threaded fasteners for attaching the end disk 31 to the compressor disk stack.

Figure 5:
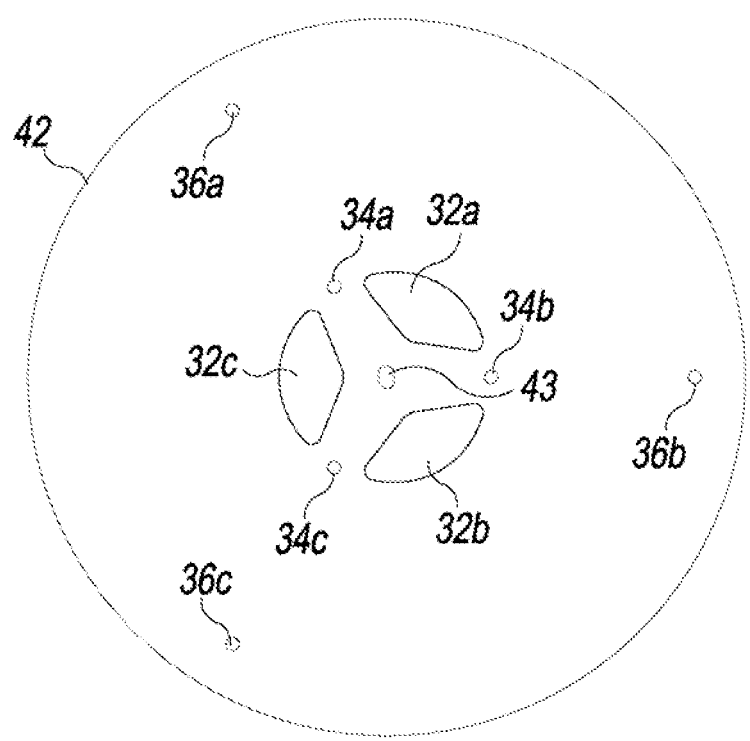
FIG. 5 is a top plan view of an end disk for a turbine disk stack of the present invention.

FIG. 5 depicts an end disk for the turbine disk stacks 40, 44 generally designated 42. The end disk 42 is defined by a generally planar disc of a particular thickness having a central opening 43 for the central shaft 24 and three (3) configured openings 32a, 32b, 32c that are radially outwardly positioned relative to and from the central opening 43. The openings 32a, 32b, 32c allow incoming air to flow through the disc. If desired, the openings 32a-c may be shaped differently if desired and/or there may be more or less openings. Additionally, the end disk 31 has three (3) radially inward threaded bores 34a, 34b, 34c and three (3) radially outward threaded bores 36a, 36b, 36c that are all configured to receive threaded fasteners for attaching the end disk 42 to the turbine disk stack.

Figure 6:
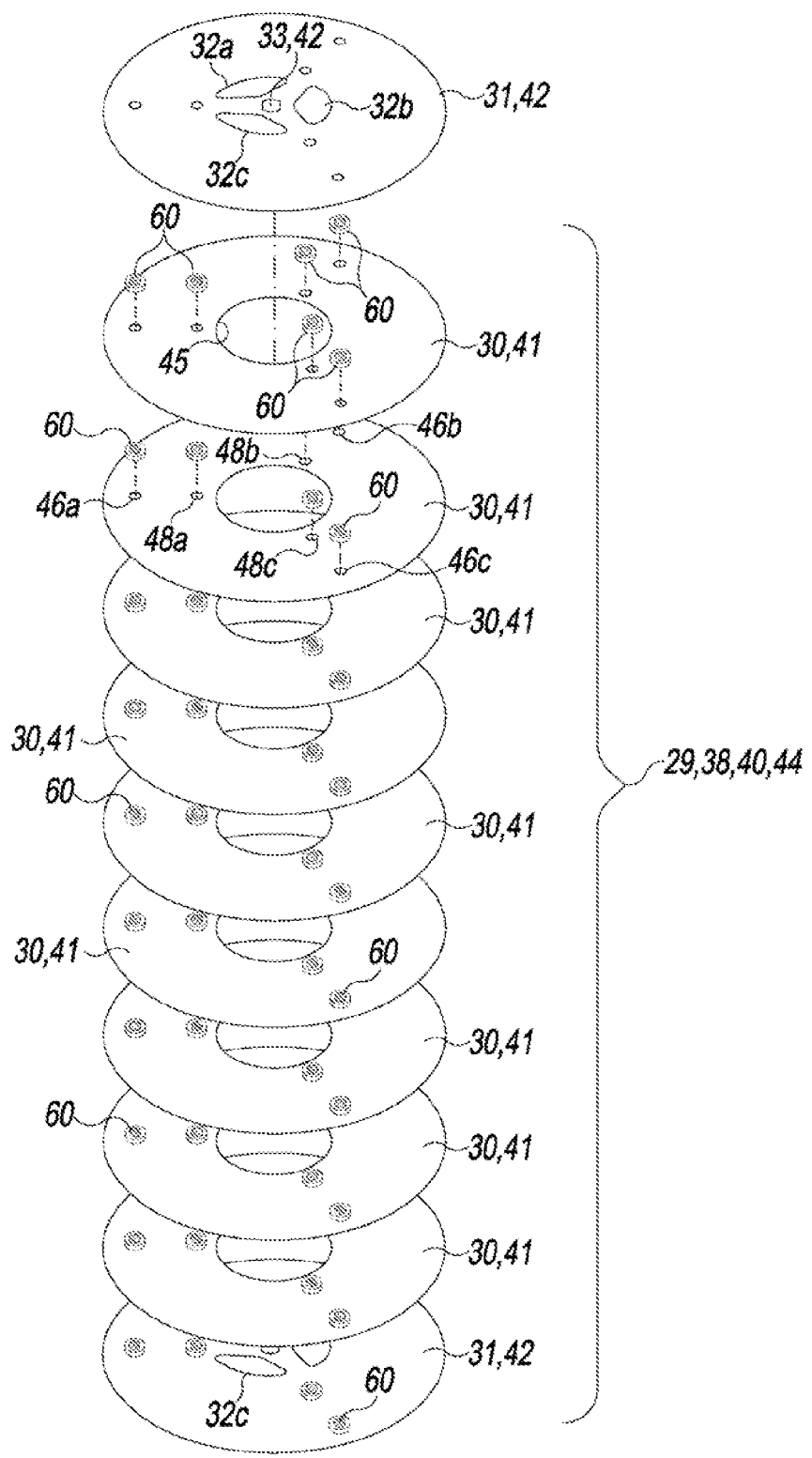
FIG. 6 is an exploded view of a compressor or turbine disk stack of the present invention.

FIG. 6 shows an exploded view of the compressor disk stacks 29, 38 and the turbine disk stacks 40, 44. Each disk stack includes a respective end disk 31, 42 on the top and bottom of the disk stack. Situated between the end disks 31, 42 is a plurality of aerosculpted compressor disks 30 (for the compressor disk stack) or aerosculpted turbine disks 41 (for the turbine disk stack) details of which are described below. In general, each aerosculpted disk 30, 41 includes three (3) radially inward threaded bores 48a, 48b, 48c that correspond in placement to the three (3) radially inward threaded bores 34a, 34b, 34c of the end disks 31, 42, as well as three (3) radially outward threaded bores 46a, 46b, 46c that correspond in placement to the three (3) radially outward threaded bores 36a, 36b, 36c of the end disks 31, 42. Spacers 60 are provided over each radially inward and outward threaded bores 48a-c, 46a-c and thus between each disk. Threaded fasteners (not shown) are used to attach the disks of the disk stack together. Other fastening means may be used. It should also be appreciated that while nine (9) aerosculpted compressor/turbine disks 30, 41 are shown, more or less aerosculpted disks may be used.

Figure 7:
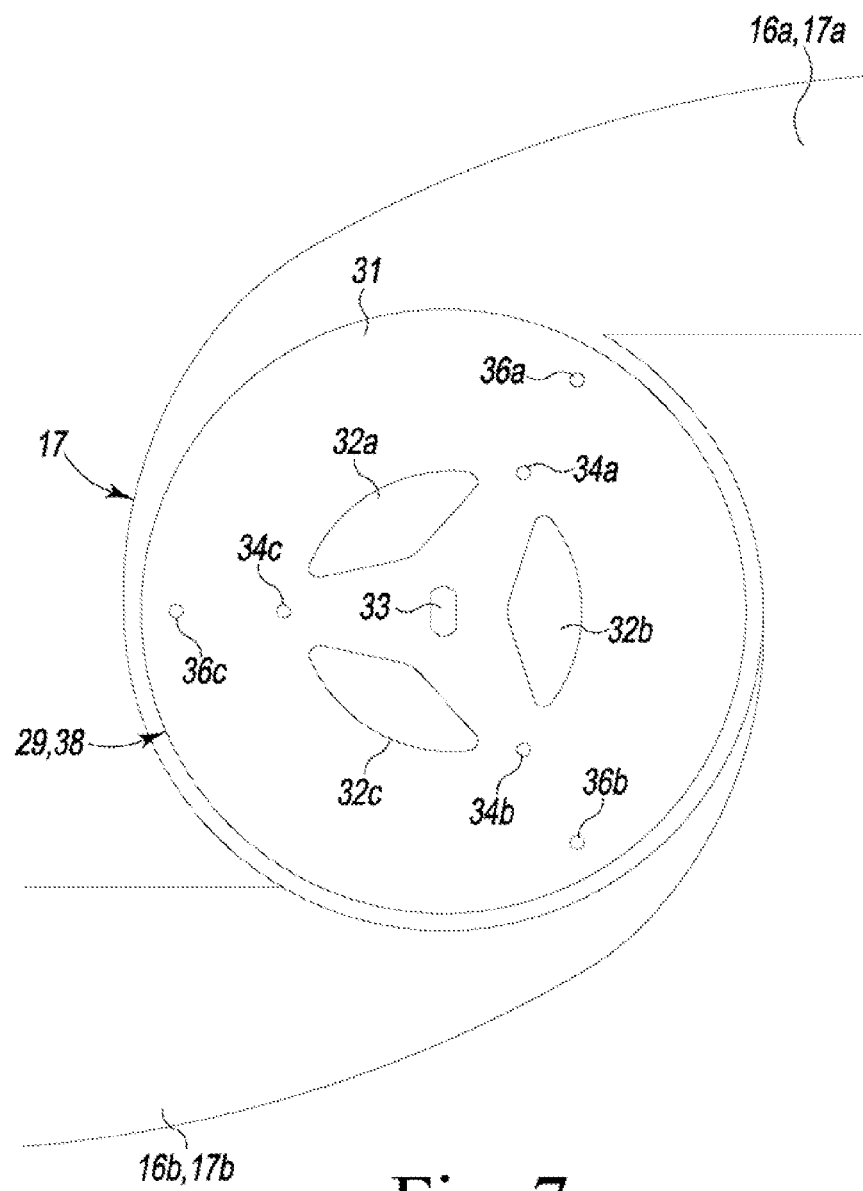
FIG. 7 is a top plan view of a compressor disk stack situated within a scroll duct of the present invention.
Figure 8:
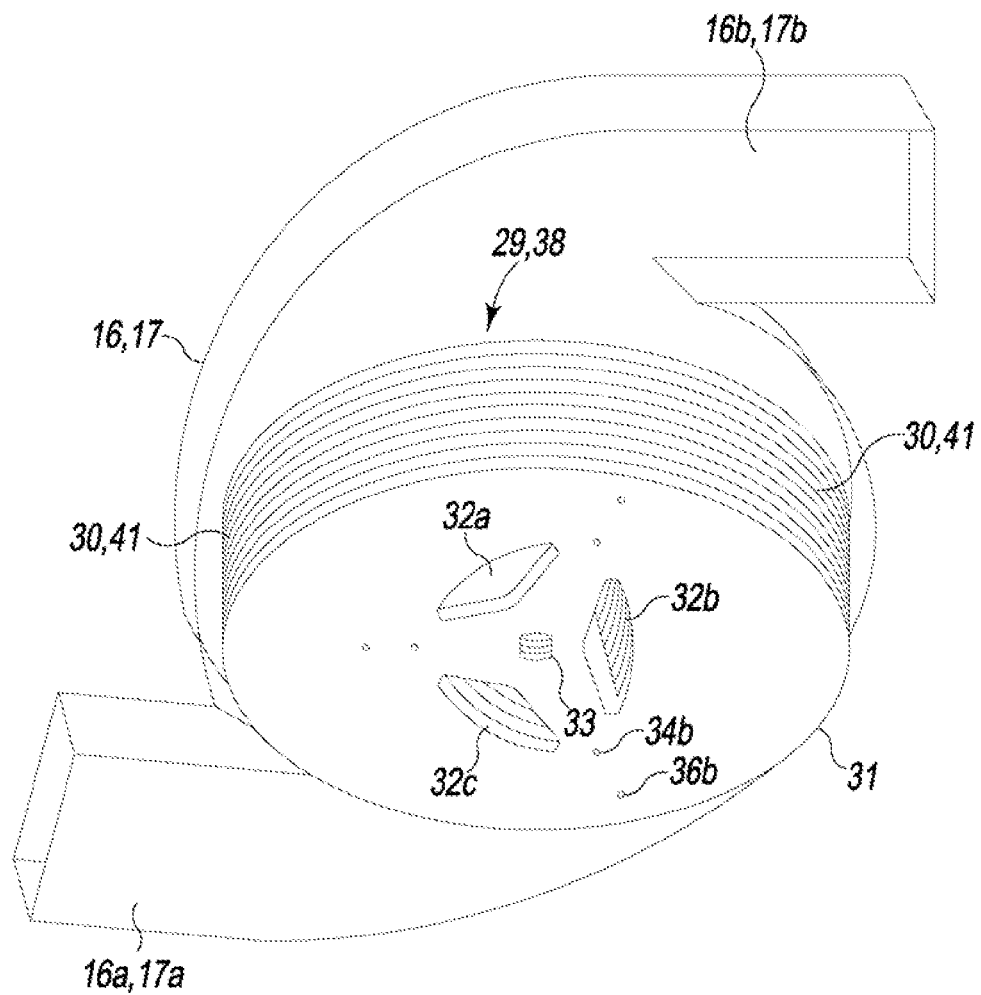
FIG. 8 is a side perspective view of the compressor disk stack situated within the scroll duct as shown in FIG. 7.

FIGS. 7 and 8 depict two views of either one of the compressor disk stacks 29, 38 situated within the engine casing and particularly with respect to either one of the respective scroll ducts 16, 17. The compressor disk stack 29, 38 receives a normal airflow through the three (3) configured openings 32a, 32b, 32c thereof. The aerosculpted disk stack 29, 38 then compressed the entrained air and exhausts it through duct portion 16a, 17a which is then, in the case of scroll duct 6, outlet into air duct 11 and ported to the inlet of the compressor disk stack 38. A compressed airflow from the compressor stack 38 is then tangentially discharged to and through duct portions 17a, 17b. This compressed airflow may be provided to the combustor/igniter 20 or directly to the first turbine stage 26 (in bypass air flow operation).

Figure 9A:
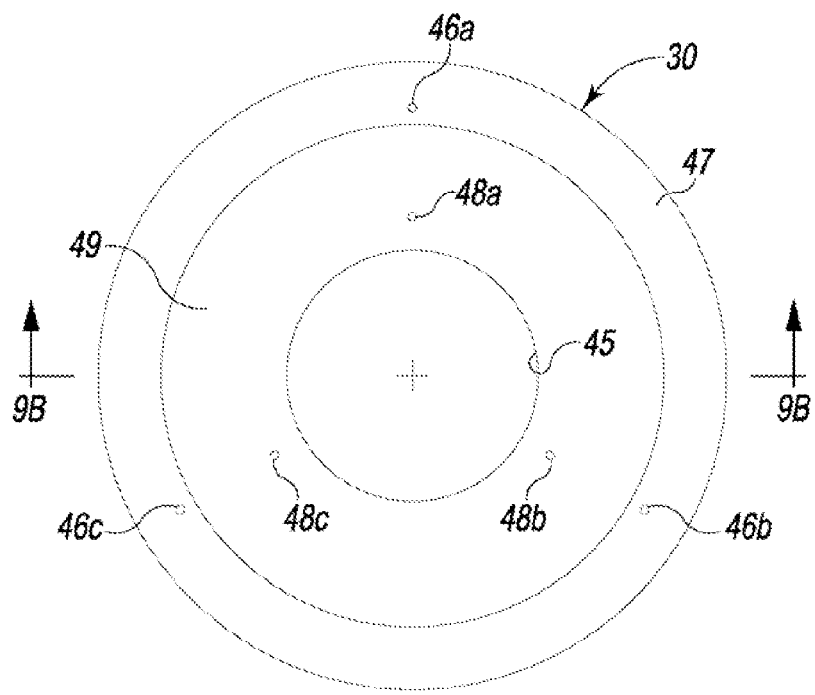
FIG. 9A is a top plan view of an aerodynamically shaped compressor disk of the compressor disk stack.
Figure 9B:
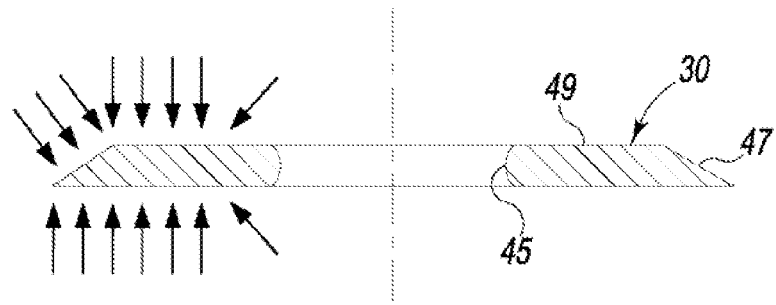
FIG. 9B is a side sectional view of the aerodynamically shaped compressor disk of the compressor disk stack as shown in FIG. 9A taken along line 9B-9B thereof.

FIGS. 9A and 9B depict two vie of an aerodynamically shaped ("aerosculpted") compressor disk 30 of either one of the compressor disk stacks 29, 38. The aerosculpted compressor disk 30 is defined by an annular disc having a central opening 45. An annular planar portion 49 is provided radially adjacent the central opening 45. Three (3) radially inward threaded bores 48a, 48b, 48c are positioned about the planar portion 49 for receiving threaded fasteners not shown). The compressor disk 30 further includes a slanted or angled peripheral portion 47. Three (3) radially outward threaded bores 46a, 46b, 46c are positioned about the angled peripheral portion 47 for receiving threaded fasteners (not shown). Further features and characteristics of the aerosculpted compressor disk are described below with reference to FIGS. 17A-D. The arrows shown in FIG. 9B represent air pressure exerted upon the present aerosculpted compressor disk 30.

Figure 10:
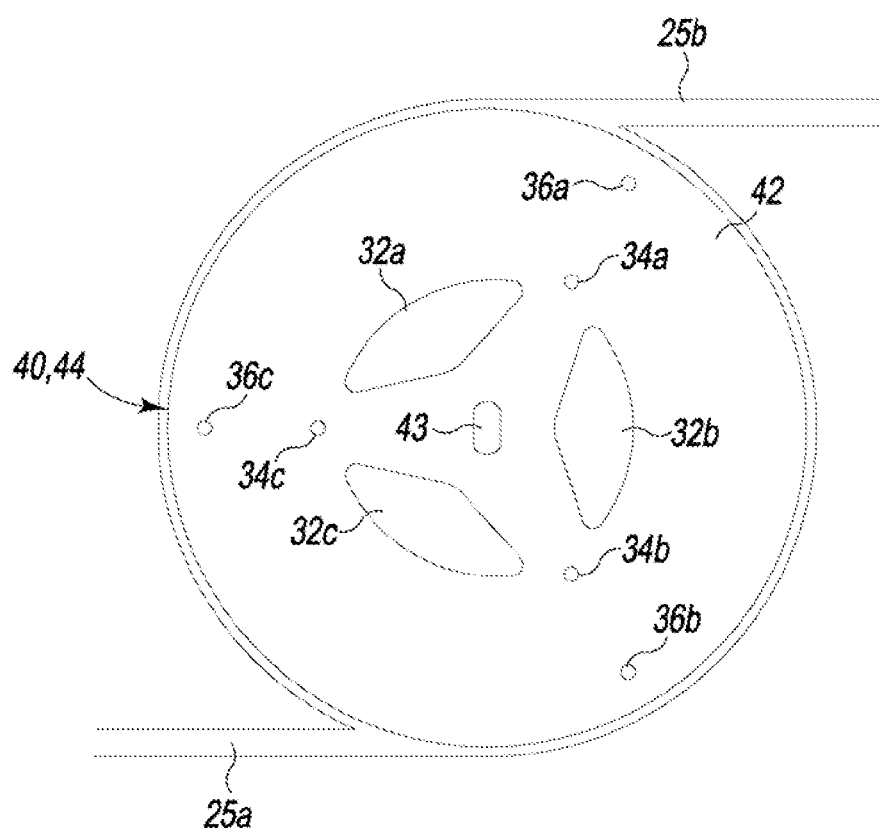
FIG. 10 is a top plan view of a turbine disk stack situated within a scroll duct of the present invention.
Figure 11:
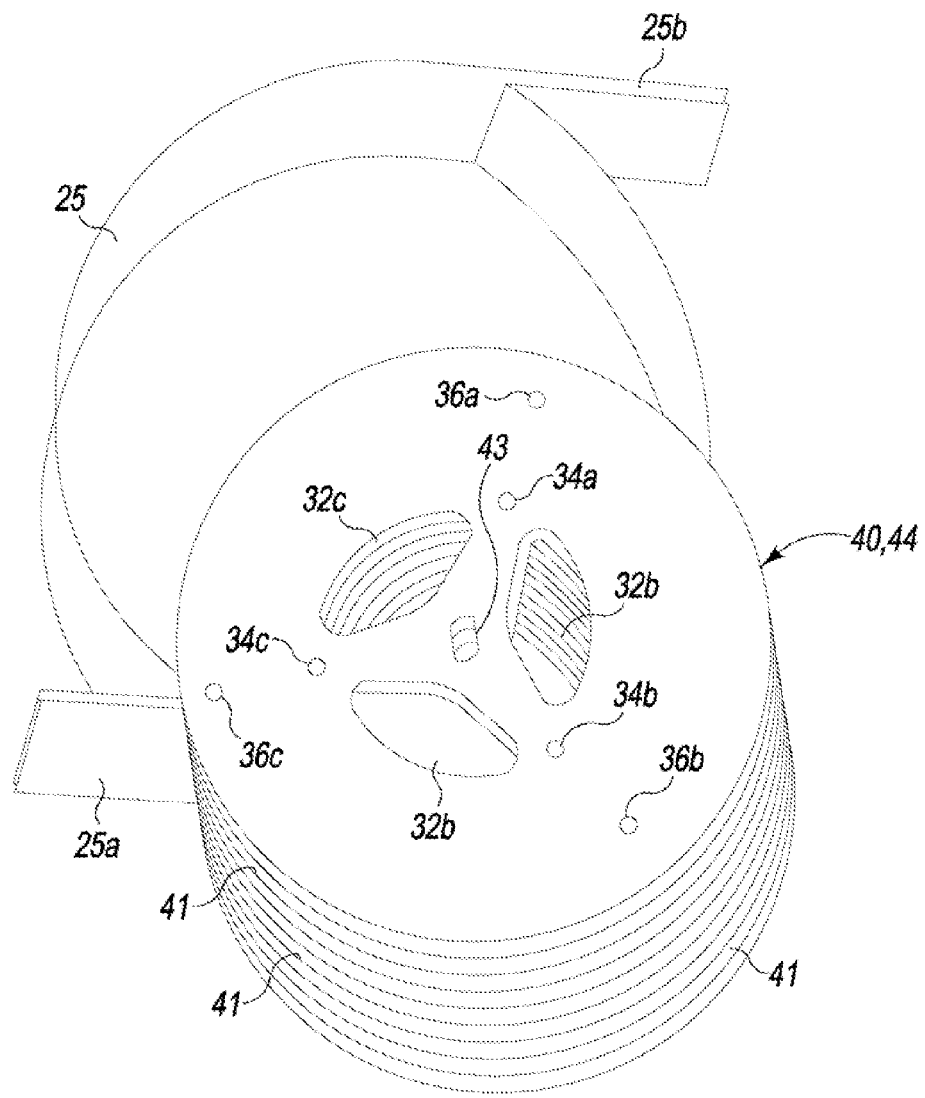
FIG. 11 is a side perspective and exploded view of the turbine disk stack and scroll duct as shown in FIG. 10.

FIGS. 10 and 11 depict two views of either one of the turbine disk stacks 40, 44 situated within the engine casing and particularly with respect to the tangential ducting 25 thereof. The turbine disk stack 40 receives a tangential airflow through duct portion 25a, 25b which is then expanded by the aerosculpted disks of the turbine disk stack 40. An expanded airflow from the turbine stack 40 is then normally discharged to and through duct portion 27. This expanded airflow is then provided tangentially to the second turbine stage 44.

Figure 12A:
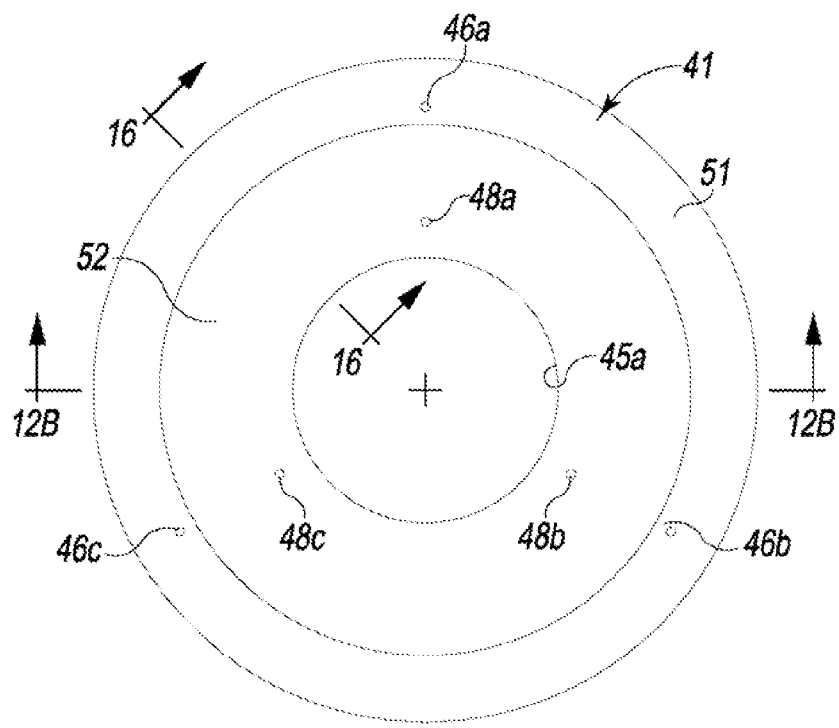
FIG. 12A is a top plan view of an aerodynamically shaped turbine disk of the turbine disk stack.
Figure 12B:
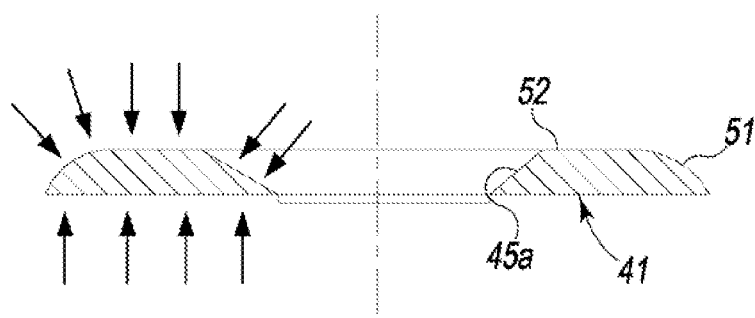
FIG. 12B is a side sectional view of the aerodynamically shaped turbine disk of the compressor disk stack as shown in FIG. 12A taken along line 12B-12B thereof.

FIGS. 12A and 12B depict two views of an aerodynamically shaped ("aerosculpted") turbine disk 41 of either one of the turbine disk stacks 40, 44. The aerosculpted turbine disk 41 is defined by an annular disc having a central opening 45a. An annular planar portion 52 is provided radially adjacent the central opening 45a. Three (3) radially inward threaded bores 48a, 48b, 48c are positioned about the planar portion 52 for receiving threaded fasteners (not shown). The turbine disk 41 further includes a slanted or angled peripheral portion 51. Three (3) radially outward threaded bores 46a, 46b, 46c are positioned about the angled peripheral portion 51 for receiving threaded fasteners (not shown). Further features and characteristics of the aerosculpted turbine disk are described below with reference to FIGS. 15A-D. The arrows shown in FIG. 12B represent air pressure exerted upon the present aerosculpted turbine disk 41.

Referring to FIGS. 15A-D various embodiments of the aerodynamically configured turbine disk 41 are shown in cross section to illustrate an area extending from at outer perimeter 61 to an inner perimeter 64. Each figure illustrates an upper convex surface 63 originating at the outer perimeter 61 that joins to a leading edge 59 of aerodynamically protruding annular fin 62. The leading edge 59 is shown as having a juncture with a descending edge 58 which, turn, has a juncture with a straight upper 65. The straight upper surface 65 terminates at the inner perimeter 64. An outer skin 66 is also illustrated in these figures.

Figure 15A:
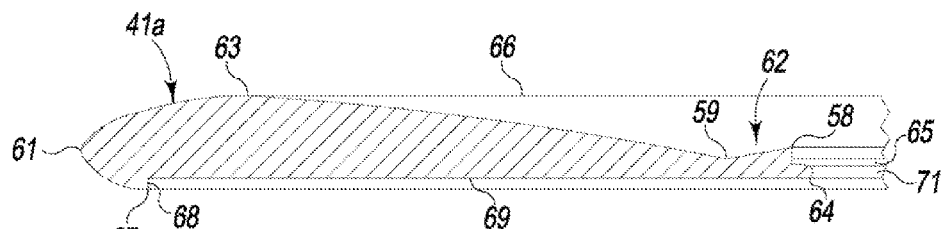
FIG. 15A is a side sectional view of an embodiment of an aerodynamically shaped turbine disk in accordance with the present principles.

The aerodynamically configured turbine disk 41a as shown in FIG. 15A particularly illustrates the underside of the annular, aerodynamically configured turbine disk having a lower convex surface 67, a straight vertical undercut 68, and a lower cutaway surface 69, wherein the lower cutaway surface 69 is parallel to the horizontal plane. A central convex surface 71 terminates at the inner perimeter 64.

Figure 15B:
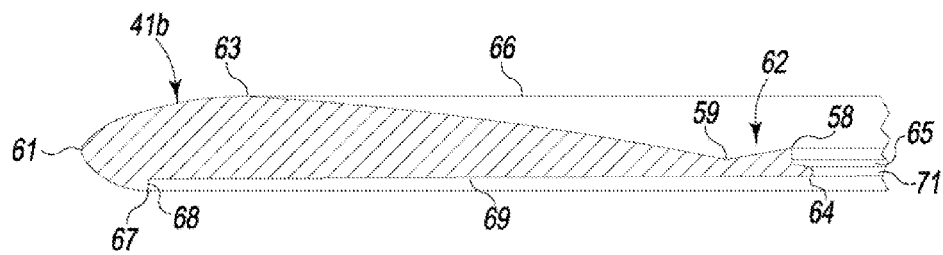
FIG. 15B is a side sectional view of an embodiment of an aerodynamically shaped turbine disk in accordance with the present principles.

The aerodynamically configured turbine disk 41b as shown in FIG. 15B particularly illustrates the underside of the annular, aerodynamically configured turbine disk having a lower convex surface 67, a straight vertical undercut 68, and a lower cutaway surface 69, wherein the lower cutaway surface 69 is at an angle to the horizontal plane. A central convex surface 71 terminates at the inner perimeter 64.

Figure 15C:
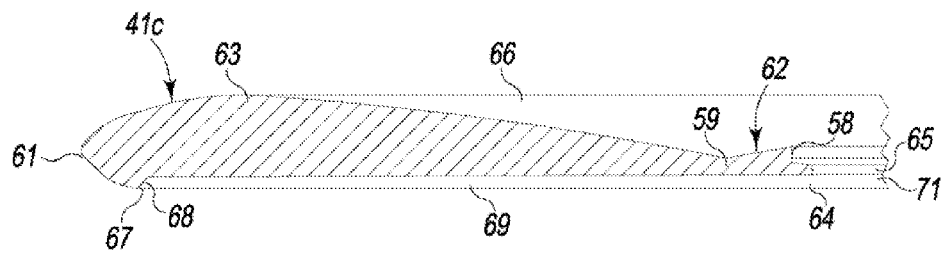
FIG. 15C is a side sectional view of an embodiment of an aerodynamically shaped turbine disk in accordance with the present principles.

The aerodynamically configured turbine disk 41c as shown in FIG. 15C particularly illustrates the underside of the annular, aerodynamically configured turbine disk having a lower convex surface 67, a curved vertical undercut 68, and a lower cutaway surface 69, wherein the lower cutaway surface 69 is at an angle to the horizontal plane. A central convex surface 71 terminates at the inner perimeter 64.

Figure 15D:
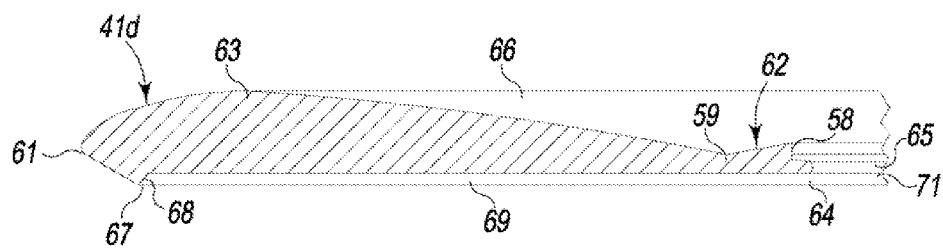
FIG. 15D is a side sectional view of an embodiment of an aerodynamically shaped turbine disk in accordance with the present principles.

The aerodynamically configured turbine disk 41d as shown in FIG. 15D particularly illustrates the underside of the annular, aerodynamically configured turbine disk having a lower convex surface 67, an angled vertical undercut 68, and a lower cutaway surface 69, wherein the lower cutaway surface 69 is parallel to the horizontal plane. A central convex surface 71 terminates at the inner perimeter 64.

It should be appreciated that other embodiments of an annular, aerodynamically configured turbine disk may be fashioned in accordance with the present principles. For instance, and without being exhaustive, an annular, aerodynamically configured turbine disk may include an underside having a lower convex surface, a curved vertical undercut, and a lower cutaway surface, where the lower cutaway surface is parallel to the horizontal plane. Another annular, aerodynamically configured turbine disk may include an underside having a lower convex surface, an angled vertical undercut, and a lower cutaway surface, where the lower cutaway surface is parallel to the horizontal plane. A further annular, aerodynamically configured turbine disk may include an underside having a lower convex surface, an angled vertical undercut, and a lower cutaway surface, where the lower cutaway surface is at an angle to the horizontal plane. A yet further annular, aerodynamically configured turbine disk may include an underside having a straight lower surface, an angled vertical undercut, and a lower cutaway surface, where the lower cutaway surface is at an angle to the horizontal plane. A still further annular, aerodynamically configured turbine disk may include an underside having a straight lower surface, a curved vertical undercut, and a lower cutaway surface, where the lower cutaway surface is parallel to the horizontal plane. An even further annular, aerodynamically configured turbine disk may include an underside having a straight lower surface, a curved vertical undercut, and a lower cutaway surface, where the lower cutaway surface is at an angle to the horizontal plane. A yet further annular, aerodynamically configured turbine disk may include an underside having a straight lower surface, a straight vertical undercut, and a lower cutaway surface where the lower cutaway surface is parallel to the horizontal plane. A still further annular, aerodynamically configured turbine disk may include an underside having a straight lower surface, a straight vertical undercut, and a lower cutaway surface, where the lower cutaway surface is at an angle to the horizontal plane.

Figure 16:
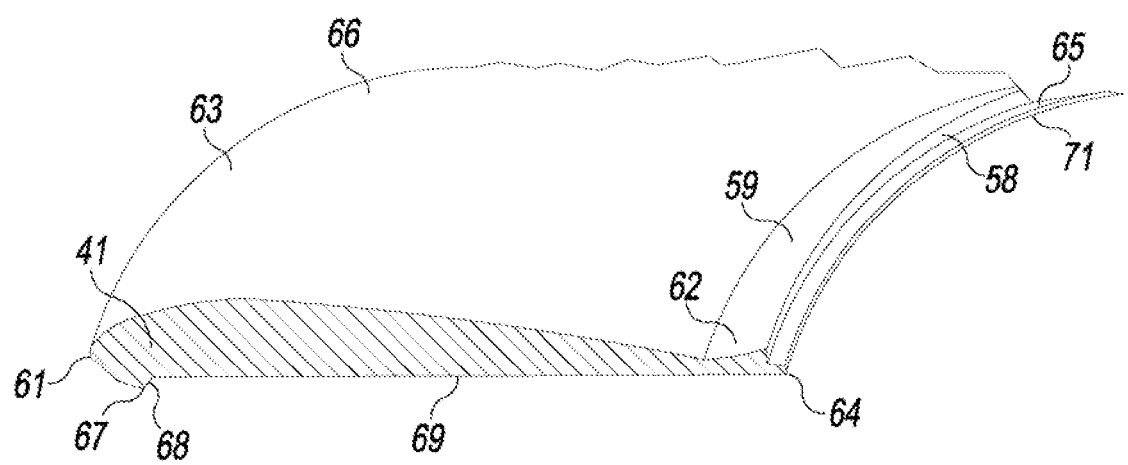
FIG. 16 is an enlarged partial, sectional view of an embodiment of an aerodynamically shaped turbine disk in accordance with the present principles.

Referring to FIG. 16, a section of the turbine disk 41 as illustrated in FIG. 12A is shown in cross-section, taken along line 16-16 thereof. The section shows the outer perimeter 61, an inner perimeter 64, and an outer skin 66. The upper surface of the turbine disk 41 has a convex upper surface 63 that extends from the outer perimeter 61 to a juncture with the leading edge 59 of aerodynamic protruding annular fin 62. Leading edge 59 extends to a juncture with descending edge 58 of the aerodynamic protruding annular fin 62. The descending edge 58 terminates at a juncture with a straight upper surface 65 which terminates at an inner perimeter 64. The underside of the turbine disk 41 has a lower convex surface 67 that originates at an outer perimeter 61 and terminates at a juncture with a straight vertical undercut 68. The straight vertical undercut 68 connects the lower convex surface 67 with a lower cutaway surface 69. The lower cutaway surface 69 originates at the upper extremity of the straight vertical undercut 68 and terminates at a juncture with central convex surface 71. The central convex surface 71 terminates at the inner perimeter 64.

In operation, air (or other fluid) is directed into the turbine disks/disk stack where the convex upper surface 63 diverts airflow in an upward direction, thereby increasing the speed at which the air is traveling. This results in a decrease in air pressure above the annular, aerodynamically configured turbine disk 41. When this airflow strikes aerodynamic protruding annular fin 62, it is now more deflected upward, but more sharply than the first deflection. This diversion increases air speed and reduces air pressure once more. At the same time, air passing on the lower side of the annular, aerodynamically configured turbine disk 41, which includes the lower convex surface 67, the straight vertical undercut. 68, and the lower cutaway surface 69, is captured beneath the unit, thereby reducing speed and increasing upward air pressure.

The turbine disk 41 may be made from various materials. Without being exhaustive, these include aluminum, plastic, steel, titanium, other metals, metal alloys, ceramic, glass, and/or a combination of these. The turbine disk 41 may be manufactured by a HIP (Hot Iostatic Press) method.

Figure 17A:
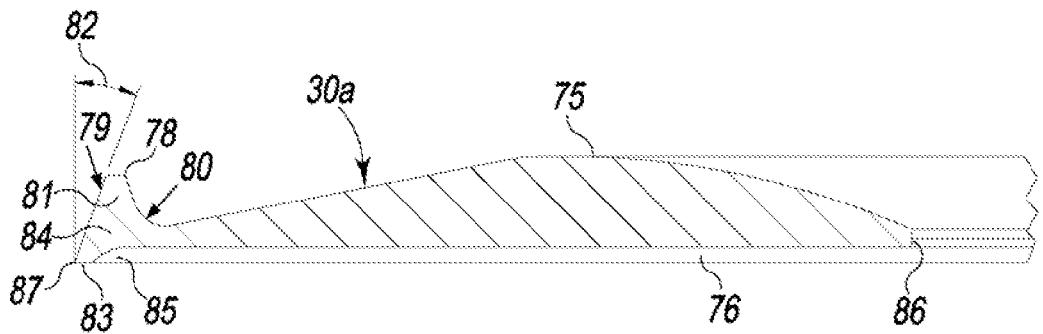
FIG. 17A is a side sectional view of an embodiment of an aerodynamically shaped compressor disk in accordance with the present principles.

Referring to FIGS. 17A-D, various embodiments of the aerodynamically configured annular compressor disk 30 are shown in cross section to illustrate the airfoil effects thereof in accordance with the present principles. The annular, aerodynamically configured compressor disk 30a of FIG. 17A illustrates a preferred embodiment. The cross-section embodies a line 76 defining a lower surface and a convex line 75 defining an upper surface. In accordance with the present principles, a separator lip 77 is provided on the outer perimeter of the upper surface. The lip 77 extends upward to a narrow peak 78 that is higher than the immediately adjacent portion of the upper surface 75 of the airfoil (disk). The lip 77 provides stability during rotation over a wide range of air velocities.

Moreover, the lip 77 is termed a separator lip in that it is believed that the lip causes the airflow to separate from the leading edge of the forward portion of the airfoil. It is further believed that the separator lip 77 reduces the lift slope of the forward portion of the airfoil so that it becomes balanced with the lift slope of the aft portion or the disk. The lift slope is the rate of change of lift versus angle of incidence or dL/dA ($\Delta L/\Delta A$) where L=lift and A=angle of incidence. It is further believed that the lift slopes of the forward aft sections of the aerodynamically configured annular disk have become matched (due to the action of the separator lip) because the aerodynamically configured annular disk is stable over a wide range of airflow velocities and angle of incidence.

It has been also been discovered by the inventor that an important parameter of the separator lip 77 is that it must have a narrow peak 78 in order to produce stable rotation as described above. A preferred width of the peak is less than one millimeter (1 mm). However, other widths may be used. A preferred embodiment has the peak 78 is substantially defined by the joining together of the surfaces 79 and 80 immediately adjacent to the peak 78. For stable spinning (or flight), the angle 81 between the adjacent surfaces 79, 80 should be less than 60 degrees (60°).

It has also been discovered by the inventor that an important parameter of the separator lip 77 is the angle 82 formed between a line tangent to an outer surface 79 of the lip 77 and the axis of revolution of the disk. If this angle is too great, stable spinning will not be maintained over a wide range of velocities. As the angle 82 is increased, there is a reduction of its stability. For example, a disk with an angle of 45 degrees (45°) was found to have less stability than other disks with smaller angles. In a preferred embodiment, this angle is approximately 30 degrees (30°).

Figure 17B:
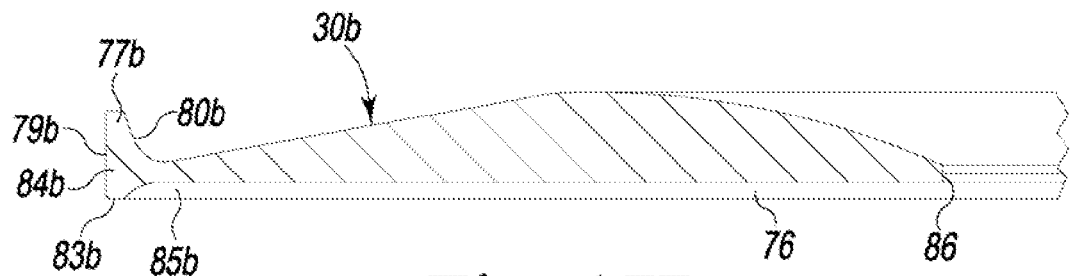
FIG. 17B is a side sectional view of an embodiment of an aerodynamically shaped compressor disk in accordance with the present principles.
Figure 17C:
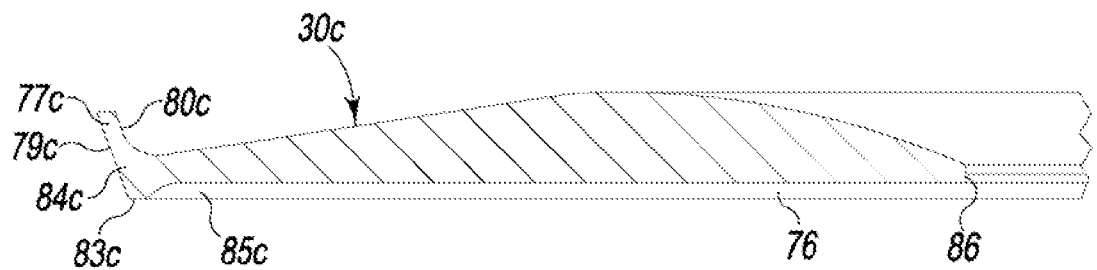
FIG. 17C is a side sectional view of an embodiment of an aerodynamically shaped compressor disk in accordance with the present principles.

Other angles 82 are illustrated in FIGS. 17B and 17C. FIG. 17B shows a compressor disk 30b with an angle 82 of zero degrees (0°) while FIG. 17C shows a compressor disk 30c with an angle 82 of minus 30 degrees (−30°). These disks (30b, 30c) are stable but have a less stable rotation than the preferred embodiment disk 30a of FIG. 17A. While the sectional views illustrate a straight line defining the outer edge of the lip 77, which creates a conical surface, it is believed that stable spinning can also be achieved if this line was curved—provided that the peak of the lip 77 is narrow.

Another important parameter of the compressor disks is the line defining the upper surface 75 of the airfoil section is convex in order to develop adequate lift combined with stability and low drag. In a preferred embodiment, the zenith of the convex upper surface 75 is the highest point on the airfoil section. It was determined that best results were achieved when this zenith is closer to the inner perimeter than to the outer perimeter. The preferred location for this zenith was discovered to be about one-third (⅓) of the distance from the inner perimeter to the outer perimeter.

As shown in FIG. 17A, the airfoil section of the compressor disk 30a has a substantially straight line 76 defining a substantially flat lower surface except for a downwardly depending flap 83 in the region of the outer perimeter of the lower surface. It has been determined that this flap aids in achieving balanced spinning. The flap 83 is also illustrated in the alternative sections of the compressor disks 30b and 30c shown in FIGS. 17B and 17C respectively.

Figure 17D:
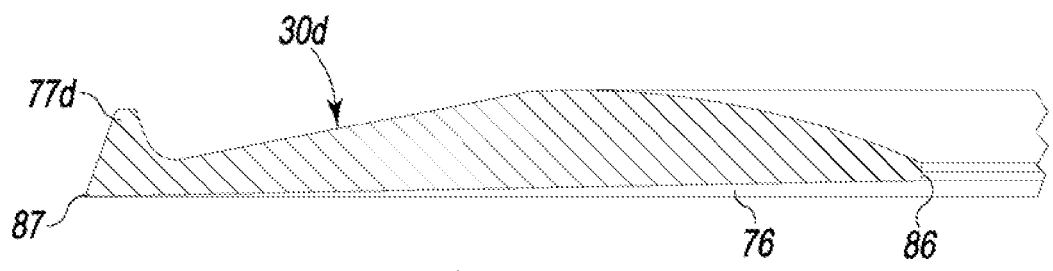
FIG. 17D is a side sectional view of an embodiment of an aerodynamically shaped compressor disk in accordance with the present principles.

FIG. 17D illustrates a compressor disk 30d having an alternative to the flap 83. Particularly, the compressor disk 30d defines an angled airfoil in which the inner perimeter is higher than the outer perimeter. It has been discovered that either this higher inner perimeter, or the flap 83, or a combination of these features is needed to achieve stable spin.

It is alternatively correct in describing the separator lip 77 and the flap 83 of the compressor disk 30 to indicate that the compressor disk 30 includes an outer rim 84 adjacent to its outer perimeter. This rim 84 is comprised of an outer rim surface 79 extending from a bottom edge 83 below the lower airfoil surface 76 to a top edge 78 above the outer portion of the upper airfoil section 75, an upper-inner rim surface 80 extending downward from the top edge 78 to the outer portion of the upper airfoil surface 75, and a lower rim surface 85 extending upward from the bottom edge 83 to the lower airfoil surface 76.

The compressor disk 30 may be made from various materials. Without being exhaustive, these include aluminum, plastic, steel, titanium, other metals, metal alloys, ceramic, glass, and/or a combination of these. The compressor disk 30 may be manufactured by the HIP method.

A disk stack in accordance with the present principles may have an inner perimeter that is higher than the outer perimeter. The airfoil section of an aerosculpted compressor or turbine disk may have a downwardly depending flap adjacent the outer perimeter. A line tangent to the outer surface of the separator hp is within plus or minus 45 degrees (+/−45°) of parallelism to the axis of revolution of the disk. The inner and outer perimeters of the aerosculpted disk may be circles described about the axis of revolution. Moreover, an aerosculpted disk has an angular moment capable of assisting its aerodynamic lift. Furthermore, the upper and/or lower surfaces of an aerosculpted turbine and/or compressor disk may be textured in order to improve aerodynamic performance and boundary layer entrainment. Still further, a convex line of an aerosculpted compressor and/or turbine disk, defining the upper surface thereof, reaches a zenith at a location that is substantially one third (⅓) of the distance from the inner perimeter to the outer perimeter.

With respect to the airfoil of the present aerosculpted compressor and turbine disks, in one form the annular airfoil angle is computed from the following formula: $\alpha_p = \alpha\, S_t/S_p$, where $\alpha_p$ degrees of airfoil angle in those portions of the airfoil that are angled; $S_t$=total airfoil area; $S_p$=area of the angled portions of the airfoil; $\alpha = (K \cdot W/D^2)$, where K=45±15, W=weight of the disk in ounces, and D=mean diameter of the annulus in inches.

In one form, the annular airfoil aerosculpted disk) is configured with a negative airfoil angle such that the revolution of a chord length of a chord line passing through an inner and outer perimeter of the disk defines the angled surface of a frustum of a cone. In this manner, in rotation, the forward portion of the annular airfoil is at a lower angle of incidence to the airflow path than the remainder of the annular airfoil, thereby compensating for air downwash effects from the forward portion and balancing the aerodynamic lift fore and aft in the compressor/turbine disk or disk stack. The aerosculpted disks typically, but not necessarily, have a weight of less than 2.0 ounces per square inch of projected area, thereby permitting a substantially level spin at speeds below 100 feet per second.

In another form, the airfoil angle is determined by the following formula: $\alpha = K\, W/D^2$, where $\alpha$=airfoil angle in degrees, K=45±15, W=the weight of the compressor or turbine disk in ounces, and D=mean diameter of the annulus in inches. For example, a compressor or turbine disk may have the following dimensions: weight=2 to 4 ounces, mean diameter=8 to 12 inches, chord length=1 to 3 inches, thickness of 0.05 to 0.20 inches, and airfoil angle=1 to 2 degrees.

In another form, the airfoil angle is determined by the following formula: $\alpha = K\, W/V^2\, D2$, where $\alpha$=airfoil angle in degrees, W=the weight of the compressor or turbine disk in ounces, V=intended rotation velocity in feet per second, and D=mean diameter of the annulus in inches.

In another form, the airfoil angle is determined by the following formula: $\alpha_p = \alpha\, S_t/S_p$, where $\alpha_p$=degrees of airfoil angle in those portions of the airfoil that are angled, $S_t$=total airfoil area, $S_p$=area of the angled portions of the airfoil, $\alpha = (K \cdot W/D^2)$ where K=45±15, W=the weight of the compressor or turbine disk in ounces, and D=mean diameter of the annulus in inches.

While not shown in the figures, and without being exhaustive, the present hybrid drive engine 10 could be alternately designed with low bypass air into the combustor for cooling, with intermediate bypass air into the combustor for cooling and thrust augmentation, and/or with high bypass air into the combustor for cooling, additional compressed air requirements and thrust augmentation. Additionally, the present hybrid drive engine 10 may be designed with reverse flow combustors, forward flow combustors, two (2) combustors, multiple combustors, can-ular combustors, and/or can-annular combustors. Moreover, the present hybrid drive engine 10 may be designed with a single compressor diverter to the combustor, with multiple compressor diverters to the combustor, or with two (2) compressor diverters to the combustor. Furthermore, the present hybrid drive engine 10 may be designed with a single stage compressor, a dual stage compressor, a multiple stage compressor, a single stage turbine, a dual stage turbine, or a multiple stage turbine. Still further, the present hybrid drive engine 10 may be designed with memory metals in each stage of the turbine, only aerosculpted memory metals in each stage of the turbine, with only aerosculpted disks in each stage of the turbine, with some aerosculpted disks in each stage of the turbine, and/or with convex disks in each stage of the turbine. Even further, the present hybrid drive engine 10 may be designed with only aerosculpted disks in each stage of the compressor; with only some aerosculpted disks in each stage of the compressor, with aerosculpted memory metals in each stage of the compressor, and/or with convex disks in each stage of the compressor.

It should be appreciated by those skilled in the art that the present hybrid drive engine 10 has potentially different uses, materials, sizes, methods of operation, and forms/embodiments than those explicitly shown and/or described herein. Additionally, the present hybrid drive engine may be used with gases other than air, fluids and/or a combination thereof. The present hybrid drive engine may be designed for a large or small thrust output, a large or small torque output, a large or small specific impulse output, a mega or micro traction output, or a large or small Primary Take-off Shaft output. Uses of the present hybrid drive engine include, without being exhaustive, an aircraft jet engine, an automobile engine, a watercraft engine, a locomotive engine, a space craft engine, an underwater craft engine, a power generation engine, a construction implement engine, an agricultural implement engine, a snow or ice implement engine, a land-craft engine, a medical implement engine, a robotic engine and power source, a hydraulic engine and power source, a prosthetic engine and power source, a well engine and power source, and a transportation engine and power source.

While the invention has been illustrated and described in detail in the foregoing drawings and description, the same is to be considered as illustrative and not restrictive in character, it being understood that only illustrative embodiments thereof have been show and described and that all changes and modifications that are within the scope of the following claims are desired to be protected.

All references cited in this specification are incorporated herein by reference to the extent that they supplement, explain, provide a background for or teach methodology or techniques employed herein.

What is claimed is:
1. A disk stack for an engine comprising:
   a plurality of disks;
   each disk having a body defining a closed-figure airfoil comprising;
      an upper surface and a lower surface;
      a central opening;
      an inner perimeter defined by the central opening; and
      an outer perimeter radially outward of the inner perimeter;
      the closed-figure airfoil having a cross-section comprising:
         a line defining the lower surface; and
         a convex line defining the upper surface and reaching a zenith that is a highest point on the airfoil section of the disk;
   a spacer situated within the central opening of each disk;
   an axis of revolution substantially normal to first and second planes defined by the inner perimeter and the outer perimeter of the disk; and
   a separator lip on the upper surface of the disk and located proximate the outer perimeter of the disk, the separator lip extending along a narrow ridge that is higher than the immediately adjacent portion of the upper surface.

2. The disk stack of claim 1, wherein the inner perimeter is higher than the outer perimeter.

3. The disk stack of claim 1, wherein the airfoil section has a downwardly depending flap adjacent to the outer perimeter.

4. The disk stack of claim 1, wherein a line tangent to the outer surface of the separator lip is within plus or minus 45 degrees of being parallel to the axis of revolution.

5. The disk stack of claim 1, wherein the inner and outer perimeters are circles described about the axis of revolution.

6. The disk stack of claim 1, wherein the disk has an angular moment capable of assisting aerodynamic lift.

7. The disk stack of claim 1, wherein the upper and lower surfaces are textured to improve aerodynamic performance and boundary layer entrainment.

8. The disk stack of claim 1, wherein the convex line defining the upper surface reaches the zenith at a location that is substantially one third of the distance from the inner perimeter to the outer perimeter.

9. The disk stack of claim 1, wherein the separator lip is lower than the zenith of the upper surface.

10. The disk stack of claim 9, further comprising a downwardly extending flap adjacent the outer perimeter of the lower surface.

11. The disk stack of claim 10, wherein the outer surface of the outer rim is substantially conical such that the diameter of the top edge of the rim is less than the diameter of the bottom edge of the rim.

12. A disk stack for an engine comprising:
   a plurality of disks;
   each disk having an annular body defining an airfoil with:
      an upper surface and a lower surface;
      an axis of revolution;
      a projected reference plane that is normal to the axis of revolution;
      an inner and outer perimeter; and
      a reference chord line passing through the inner and outer perimeters;
   each airfoil configured with a negative airfoil angle such that revolution of the reference chord defines an angled surface of a frustum of a cone, whereby during revolution a forward portion of the airfoil is at a lower angle of incidence to incoming air than a remainder of the airfoil thereby compensating for air downwash effects from the forward portion of the airfoil and balancing the aerodynamic lift fore and aft on the disk, the airfoil having a cross section presenting a low aerodynamic drag to a flow of air generally parallel to the projected reference plane.

13. The disk stack of claim 12, wherein at least a portion of each disk has a textured surface with features having both circumferential and radial discontinuities.

14. The disk stack of claim 12, wherein each disk is made from a high temperature material.

15. The disk stack of claim 14, wherein the high temperature material comprises a rigid metallic material.

16. The disk stack of claim 14, wherein the high temperature material comprises a high impact thermoplastic.

17. The disk stack of claim 12, wherein the negative airfoil angle is computed by $\alpha_p = \alpha\, S_t/S_p$, where $\alpha_p$=degrees of airfoil angle in those portions of the negative airfoil that are angled, $S_t$=total airfoil area, $S_p$=area of the angled portions of the airfoil, $\alpha = (K \cdot W/D^2)$ where $K = 45 \pm 15$, W=weight of the disk in ounces, and D=mean diameter of the annulus in inches.

18. The disk stack of claim 12, wherein the negative airfoil angle is computed by $\alpha = K\, W/V^2 D^2$, where $\alpha$=airfoil angle in degrees, $K = 45 \pm 15$, W=the weight of the compressor or turbine disk in ounces, and D=mean diameter of the annulus in inches.

19. The disk stack of claim 12, wherein the negative airfoil angle is computed by $\alpha = K\, W/D^2$, where $\alpha$=airfoil angle in degrees, W=the weight of the compressor or turbine disk in ounces, V=intended flight (rotation) velocity in feet per second, and D=mean diameter of the annulus in inches.

20. The disk stack of claim 12, wherein the negative airfoil angle is computed by $\alpha_p = \alpha\, S_t/S_p$, where $\alpha_p$=degrees of airfoil angle in those portions of the airfoil that are angled, $S_t$=total airfoil area, $S_p$=area of the angled portions of the airfoil, $\alpha = (K \cdot W/D^2)$ where $K = 45 \pm 15$, W=the weight of the compressor or turbine disk in ounces, and D=mean diameter of the annulus in inches.

21. An engine comprising:
   a housing;
   a compressor section disposed in the housing and comprising a compressor disk stack of a plurality of annular compressor disks having a compressor disk body defining a closed-figure airfoil;
   a turbine section disposed in the housing and in communication with the compressor section, the turbine section comprising a turbine disk stack of a plurality of annular turbine disks having a turbine disk body defining a closed-figure airfoil; and
   a central shaft mechanically linking the turbine disk stack with the compressor disk stack
wherein the closed-figure airfoil defining the body of each disk of the compressor and turbine disk stacks comprises:
   an upper surface and a lower surface;
   a central opening;
   an inner perimeter defined by the central opening;
   an outer perimeter radially outward of the inner perimeter;
   a cross-section comprising:
      a line defining the lower surface; and
      a convex line defining the upper surface and reaching a zenith that is a highest point on the airfoil of the disk; and
   a separator lip on the upper surface of the disk and located proximate the outer perimeter of the disk, the separator lip extending along a narrow ridge that is higher than the immediately adjacent portion of the upper surface.

22. The engine of claim 21, wherein the inner perimeter of each compressor and turbine disk is higher than the outer perimeter thereof.

23. The engine claim 21, wherein the airfoil section has a downwardly depending flap adjacent to the outer perimeter.

24. The engine of claim 21, wherein a line tangent to the outer surface of the separator lip is within plus or minus 45 degrees of being parallel to the axis of revolution.

25. The engine of claim 21, wherein the inner and outer perimeters of each compressor and turbine disks are circles described about the axis of revolution.

26. The engine of claim 21, wherein each compressor and turbine disk has an angular moment capable of assisting aerodynamic lift.

27. The engine of claim 21, wherein the upper and lower surfaces of each compressor and turbine disk are textured to improve aerodynamic performance and boundary layer entrainment.

28. The engine of claim 21, wherein the convex line defining the upper surface reaches the zenith at a location that is substantially one third of the distance from the inner perimeter to the outer perimeter.

29. The engine of claim 21, wherein the separator lip is lower than the zenith of the upper surface.

30. The engine of claim 29, further comprising a downwardly extending flap adjacent the outer perimeter of the lower surface.

31. The engine of claim 21, further comprising:
a second compressor section disposed in the housing and comprising a second compressor disk stack of a plurality of annular compressor disks having a compressor disk body defining a closed-figure airfoil; and
a second turbine section disposed in the housing and comprising a second turbine disk stack of a plurality of annular turbine disks having a turbine disk body defining a closed-figure airfoil;
an outer shaft mechanically linking the second compressor disk stack to the second turbine disk stack.

* * * * *